United States Patent [19]

Helvey

[11] Patent Number: 4,813,268
[45] Date of Patent: Mar. 21, 1989

[54] LEAKAGE DETECTION APPARATUS FOR DRUM WHEELS AND METHOD THEREFORE

[75] Inventor: Alex Helvey, Panorama City, Calif.

[73] Assignee: Superior Industries International, Inc., Van Nuys, Calif.

[21] Appl. No.: 29,149

[22] Filed: Mar. 23, 1987

[51] Int. Cl.$^4$ ............................................. G01M 3/20
[52] U.S. Cl. .................................................... 73/40.7
[58] Field of Search ..................... 73/40.7, 49, 49.2, 40

[56] References Cited

U.S. PATENT DOCUMENTS

| | | | |
|---|---|---|---|
| 1,507,486 | 9/1924 | Jones | 73/49 |
| 2,819,609 | 1/1958 | Liebhafsky | 73/40.7 |
| 3,027,753 | 4/1962 | Harder | 73/40.7 |
| 3,174,329 | 3/1965 | Kauffman et al. | 73/40.7 |
| 3,186,214 | 6/1965 | Roberts | 73/40.7 |
| 3,342,990 | 9/1967 | Barrington et al. | 73/40.7 |
| 3,520,176 | 7/1970 | Becker | 73/40.7 |
| 3,572,096 | 3/1971 | Meyer | 73/40.7 |
| 3,721,117 | 3/1973 | Ford et al. | 73/40.7 |
| 3,762,212 | 10/1973 | Morley et al. | 73/40.7 |
| 3,813,923 | 6/1974 | Pendleton | 73/40.7 |
| 3,820,382 | 6/1974 | Andres et al. | 73/40.7 |
| 3,855,844 | 12/1974 | Craig | 73/40.7 |
| 3,888,111 | 6/1975 | Craig | 73/40.7 |
| 3,968,675 | 7/1976 | Briggs | 73/40.7 |
| 4,055,984 | 11/1977 | Marx | 73/40.7 |
| 4,158,960 | 6/1979 | White et al. | 73/40.7 |
| 4,754,638 | 7/1988 | Brayman et al. | 73/40.7 |

FOREIGN PATENT DOCUMENTS

| | | | |
|---|---|---|---|
| 17336 | 2/1983 | Japan . | |
| 26240 | 2/1983 | Japan | 73/40.7 |
| 2000300 | 1/1979 | United Kingdom | 73/40.7 |

Primary Examiner—Michael J. Tokar
Assistant Examiner—Hezron E. Williams
Attorney, Agent, or Firm—Fulwider, Patton, Rieber, Lee & Utecht

[57] ABSTRACT

A leakage detection apparatus for drum wheels having a pair of plates which sealingly engage the wheel to define an inner first chamber under vacuum, a reciprocating container enveloping the engaged plates and wheel to define an annular helium chamber sharing the wheel as a common wall with the inner first chamber, a probe gas introduced into the annular helium chamber, and a mass spectrometer, in gaseous communication with said inner first chamber scanning for a trace of the probe gas indicating the presence of a leak path in the structual integrity of the wheel. A method of use is also disclosed.

64 Claims, 7 Drawing Sheets

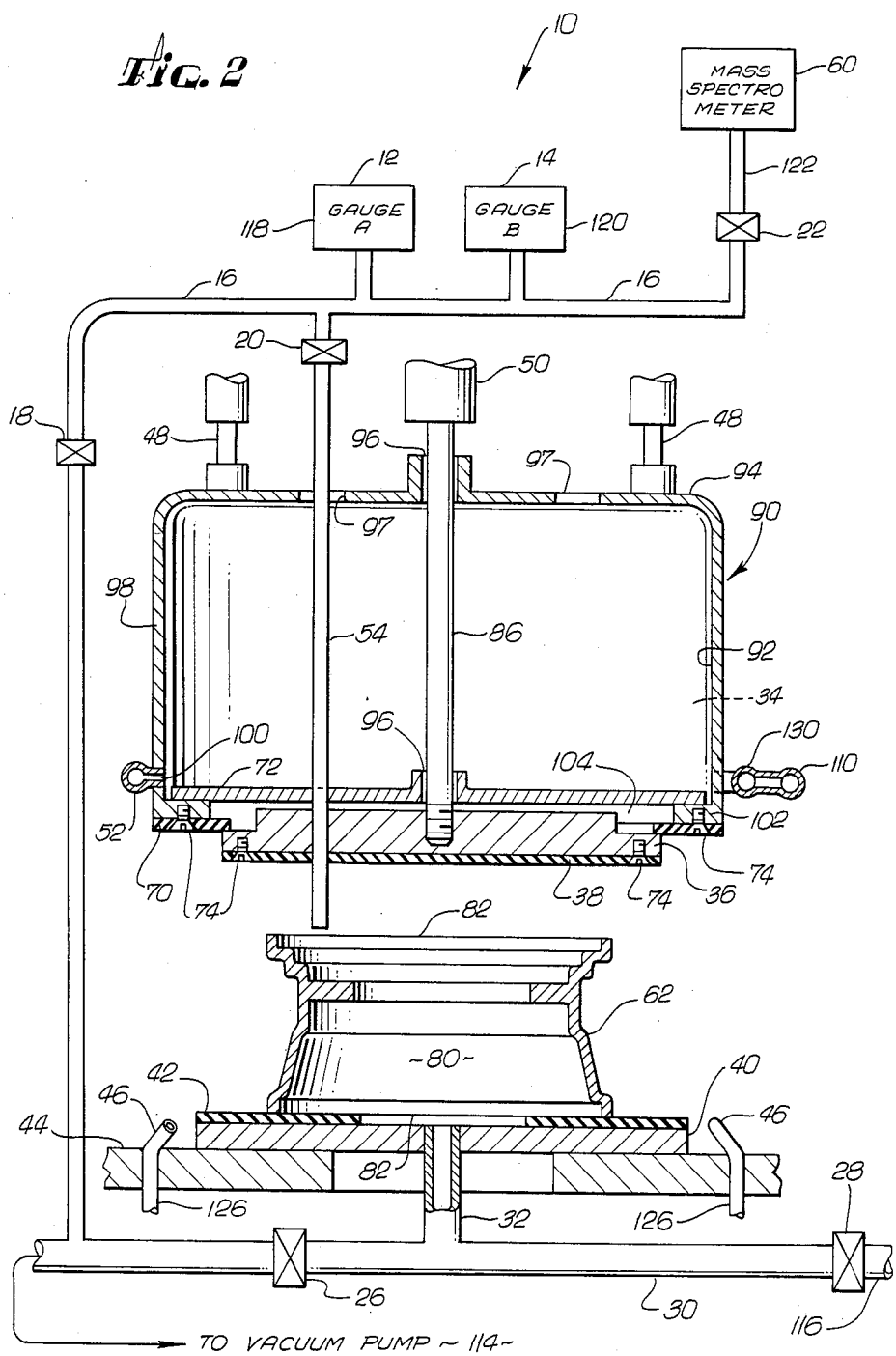

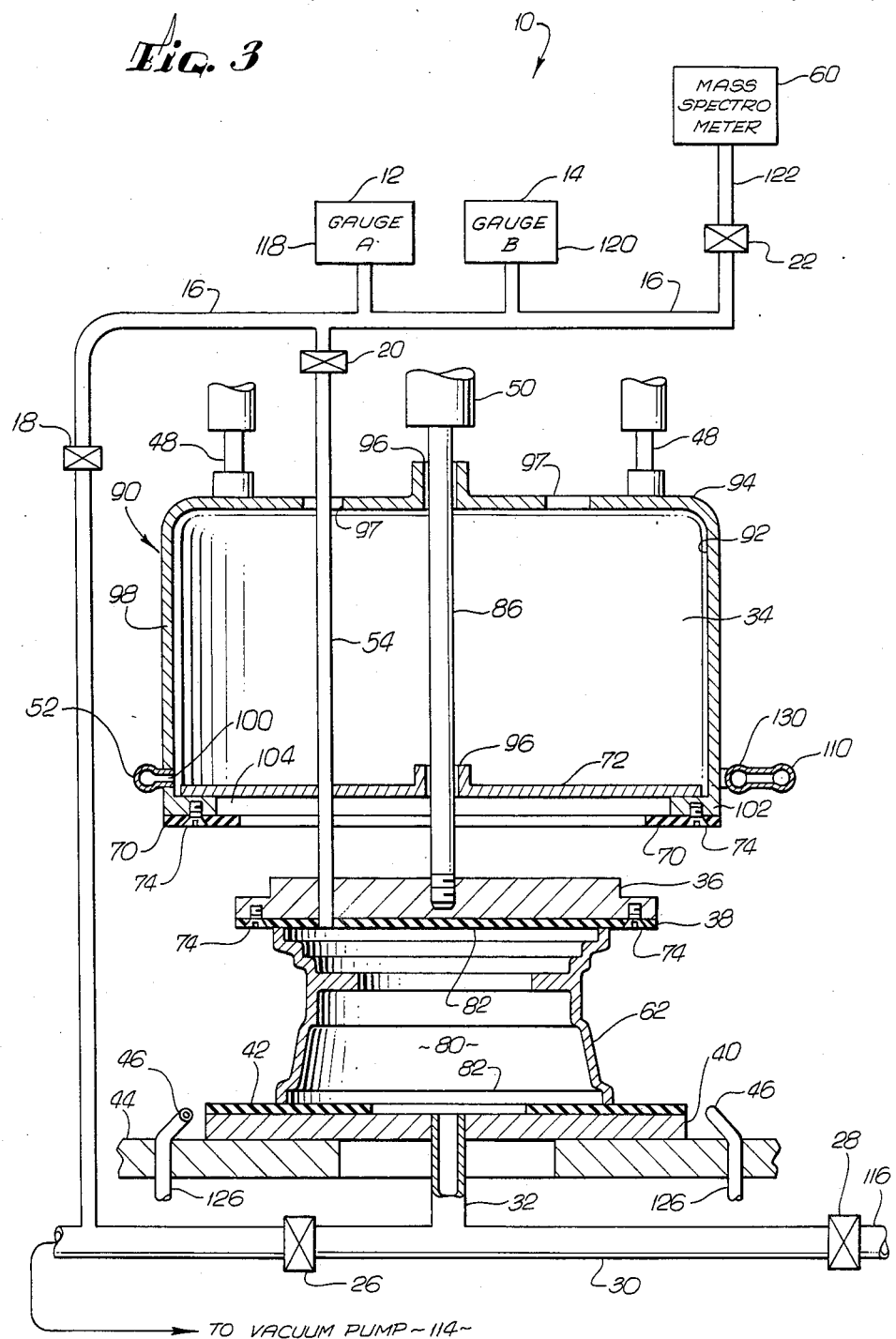

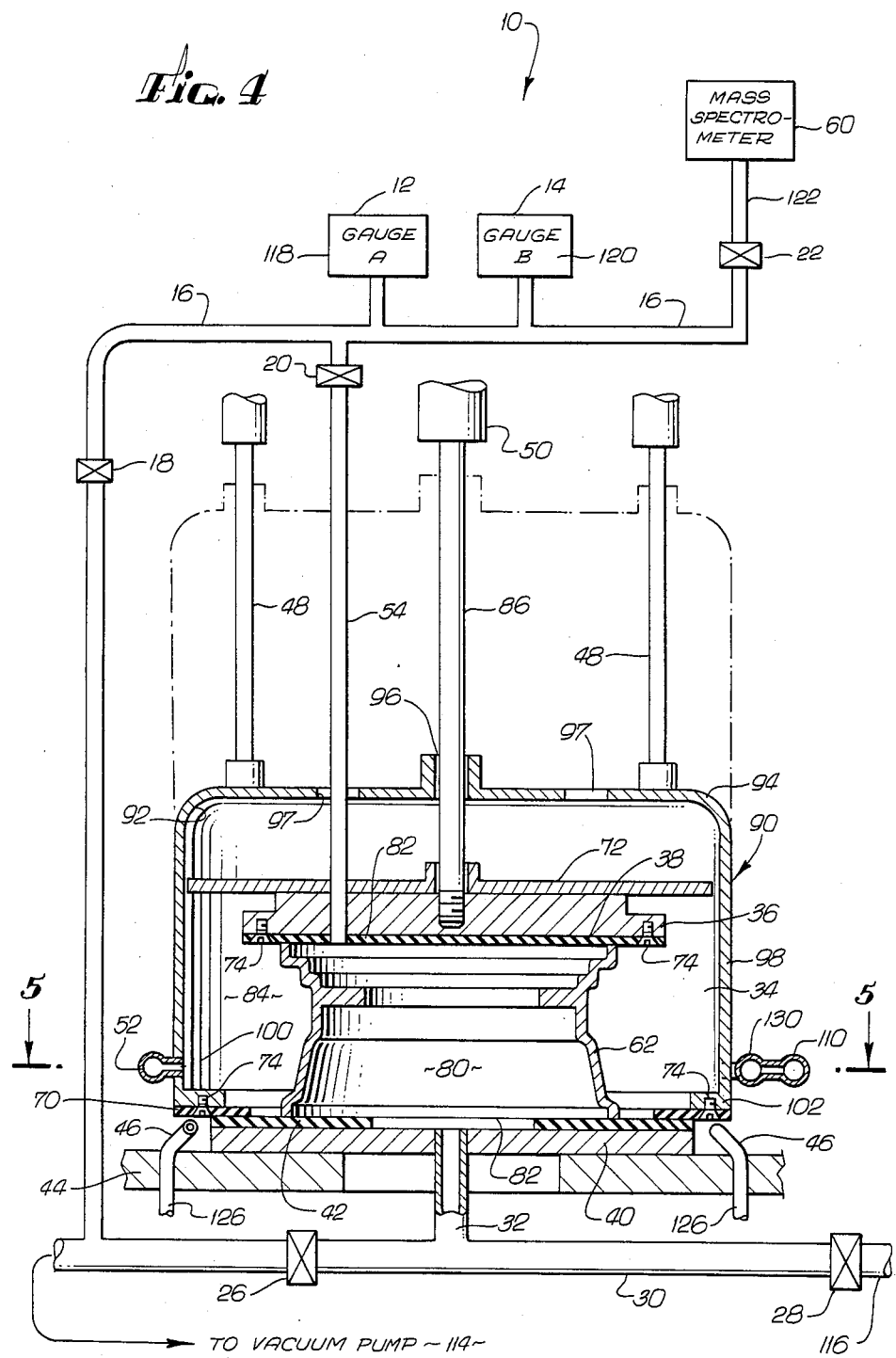

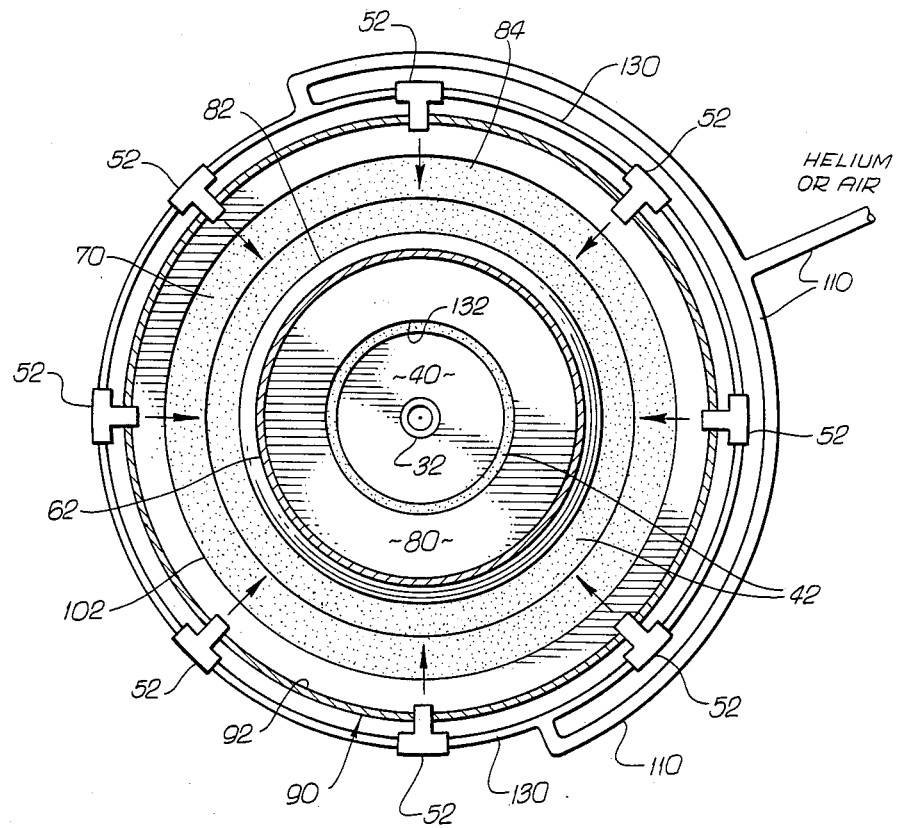

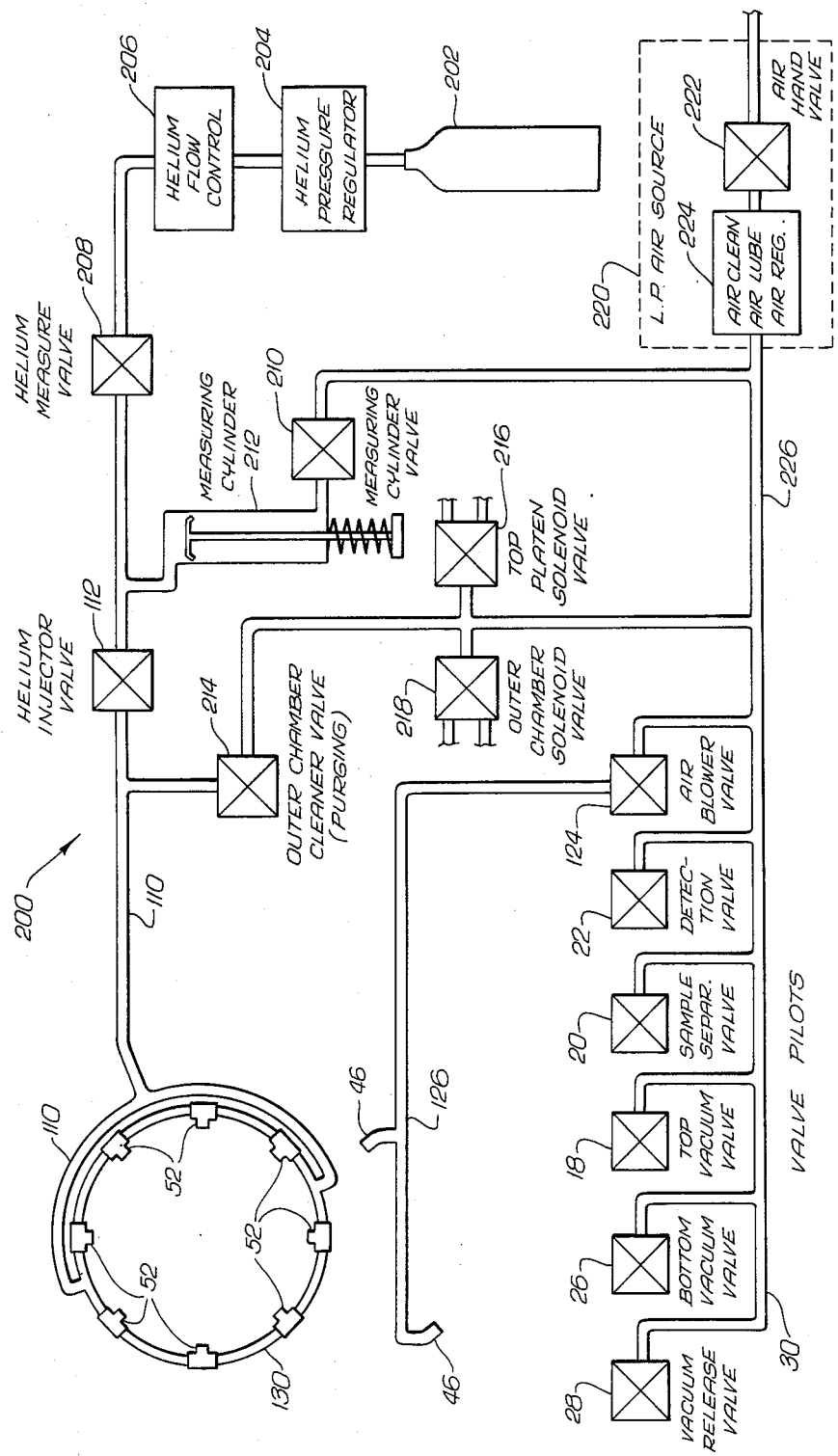

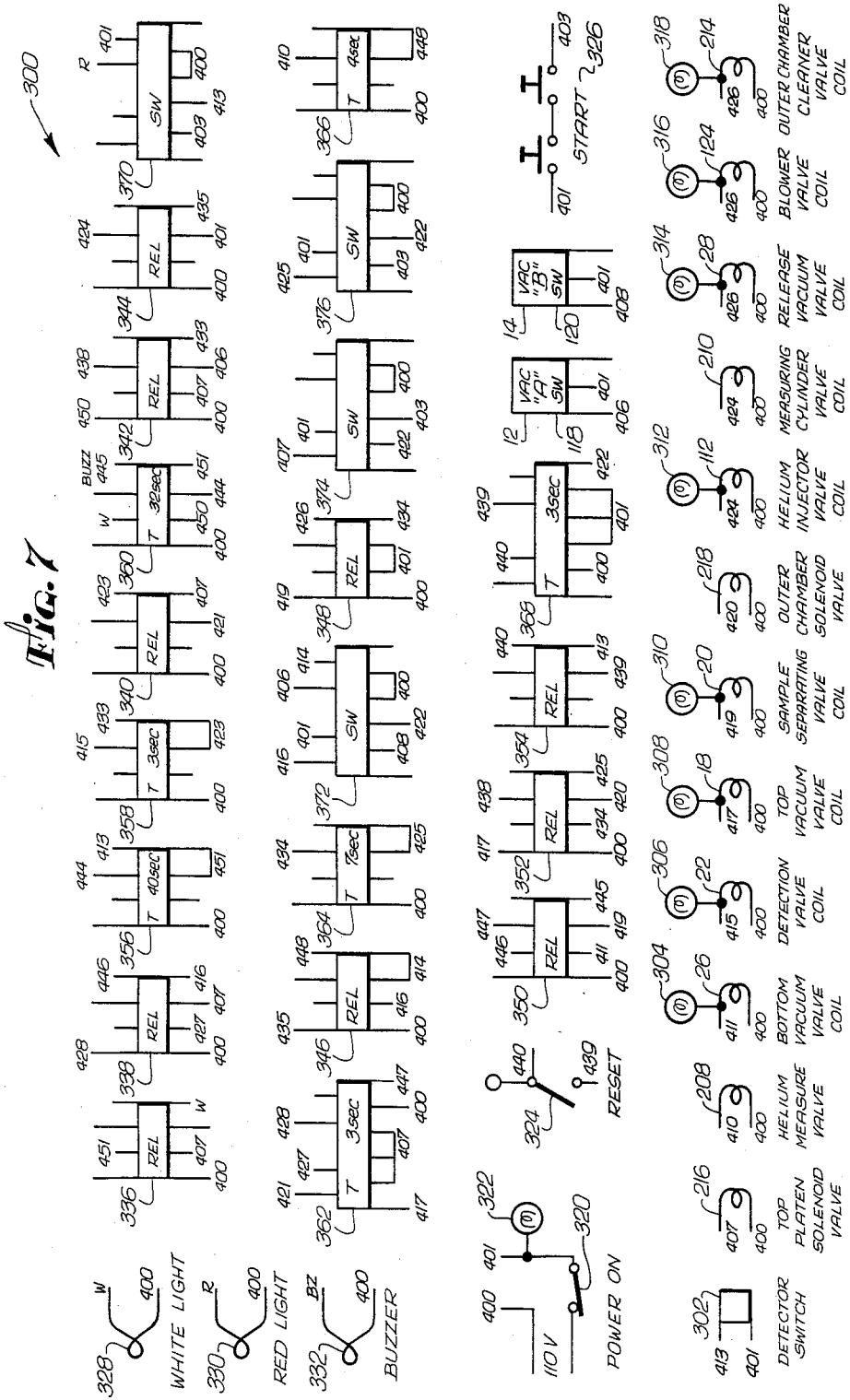

LEAKAGE DETECTION APPARATUS FOR DRUM WHEELS AND METHOD THEREFORE

BACKGROUND OF THE INVENTION

1. Field of the Invention

The invention relates generally to leak detection devices and more particularly to a leak detection apparatus employing a means for sensing the present of an inert probe gas passing from a sealed annular chamber to a vacuumized inner chamber.

2. Description of the Prior Art

In the field of vehicle manufacturing, most motor cars and trucks are fitted with drum wheels. The source of the drum wheels may be the vehicle manufacturer or a vendor supplier, each of whom are required to provide wheels that satisfy certain engineering specifications. One such specification is that wheels that are mounted on vehicles or supplied to wholesale-retail suppliers should be free of structural flaws that result in leakage of the pneumatic medium air. Certain minute structural flaws may result in very slow leakage, evidence of which may not appear until after the wheel is in use. In standard warranties covering material and workmanship, the manufacturer or vendor supplier would be obligated to repair or replace the defective wheels resulting in considerable expense for shipping, labor and material to the supplier and obvious inconvenience to the customer.

In U.S. Pat. No. 3,721,117 issued Mar. 20, 1973 to Ford et al., a method and apparatus is disclosed for detecting leaks in pneumatic wheels. Note that this reference has a number of embodiments, however, each generally provide that a tire 14 is mounted on a rim 12. The complete assembly 10 includes both the rim 12 and the tubeless tire 14. Also note that Ford et al. inflates the tire 14 with a probe gas which is preferably a mixture of air and helium. In one embodiment, the entire wheel assembly 10 is enclosed within a heat shrinkable plastic envelope 46. With the plastic envelope 46 forming a seal around a line 60/62, any volume of probe gas which leaks through the valve stem 38 or through the rim 12 will be contained by the envelope 46. Subsequently, the envelope 46 is punctured with a conventional helium detector 66 to test the space within the chambers for the presence of helium.

In the embodiment of FIG. 6, a vacuum pump 116 is connected through the pipe 114 to a one-way valve 108. After removal of the air, the covering placed over the aperture 106 is removed and the detector 118 is utilized to detect whether the helium has leaked from the wheel assembly 112 into the space bounded by the upper surface of the support platform 82 or flexible sheet 86. The use of the disposable plastic envelope 46 to provide a sea tends to decrease the reproducibility of the results together with the tire employed to contain the probe gas infers a non-automated process of wheel rejection or approval. The method and apparatus is concerned primarily with detecting leakage in the rim-tire interface and about the valve stem and not through the wheel structure itself. The use of a vacuum pump shown in FIG. 6 is for evacuating the volume within the plastic envelope 46 and not for establishing the high vacuum required when employing a mass spectrometer.

In U.S. Pat. No. 4,055,984 issued Nov. 1, 1977 to Marx, a device is disclosed for detecting leaks in flexible articles which is termed leak detection by vacuum. The procedure involves leak detection from the outside to the inside on articles with easily deformable walls. Leak detection is performed on an article 4 which is mounted within a dome 19. A vacuum is drawn into the space 66 through a nipple 18 provided in a closure 14 to the test gas detector. The article 4 is sprayed with a test gas and where a leak is present, the test gas penetrates into the evacuated space 6b. This procedure also infers a non-automated process which employs disposable hoods of plastic employed to contain a gas mixture or to trap an escaping probe gas.

In U.S. Pat. No. 3,174,329 issued Mar. 23, 1965, to Kaufmann et al., there is disclosed a method for testing ordinance (projectile) seals. The underwater ordinance 10 is first charged internally by a gaseous composition such as Freon-12 and then placed into an enclosed test chamber 11. A ventilation blower 14 is energized to circulate ambient air through the chamber 11 via a ventilation duct 13. A sampling probe 15 of a detector 16 is inserted into a fitting 18 in the duct 13 to obtain a sample of air for analysis purposes. The ordinance (projectile) is portrayed as a hermetically sealed unit which is comprised of a flexible plastic material which is collapsible for storage purposes. Note that this invention does not present the problems associated with leak testing an open container and a vacuum system is not involved.

In U.S. Pat. No. 3,813,923 issued June 4, 1974, to Pendleton, there is disclosed an adaptive fixture for leak testing of containers. The system 10 illustrates a diaphragm-type enclosure employed for leak testing a container 11 such as an automobile fuel tank and includes a top frame 12 having a hollow portion 13. A second frame 14 exists which has another hollow portion 15. A first flexible diaphragm 16 is mounted to the frame 12 and extends across the hollow portion 13. The diaphragm 16 is spaced from the inside surface 17 of the frame 12 and defines a first pressure chamber 18 between the surface 17 and the diaphragm 16. By opening the valve 43 in the line an allowing the pressurized gas to communicate within the chambers 18, 21, the chambers 18, 21 are pressurized and force the diaphragms 16, 19 to conformingly fit around and support the container 11. This action reduces the volume of the enveloping container 11 and also provides external pressure to the container 11 to counteract internal pressure supplied by a pumping of a probe gas into the fixture being tested. Note the diaphragms 16 and 19 act as a stabilizer support and the test container does not become an integral part of the adaptive fixture.

In U.S. Pat. No. 3,968,675 issued July 13, 1976 to Briggs, there is disclosed a method and system for preparing a mass spectrophotometer leak detector system tuned to detect the presence of a helium gas. A roughing pump 8 is operated with a valve 16 closed and a valve 18 open. A high vacuum pump 3 reduces the total pressure in the mass spectrophotometer 1 to operating levels. At this point, the mass spectrophotometer 1 is energized while the air inlet valve 14 is physically removed and the inlet fitting 12 is coupled to a leak test arrangement. If the structure being leak tested developes a leak, the helium test gas will pass through the leak and the presence of helium will be indicated on the mass spectrophotometer 1. The Briggs '675 patent appears to address the specific problem of providing a reference valve to ascertain the partial pressure of helium within an air volume. This system appears to quantize the amount of helium gas which has passed through the system and not a device that indicates the presence of any probe gas.

In U.S. Pat. No. 3,855,844 issued Dec. 24, 1974, to G. M. Craig, there is disclosed a leak detection system for sealed beam headlamp units, each of which has a gas fill including helium, wherein a unit is placed in a test chamber which is evacuated to draw the gas fill through any unit leakage paths into the chamber. A first pressure gauge coupled to the chamber performs a first leakage check. If the pressure is above a predetermined value indicative of a high rate of leakage, the unit is rejected, otherwise, a metered volume of carbon dioxide is injected into the chamber for admixing with any leakage gas fill. A second leakage check test is conducted rejecting those units with pressures above a predetermined high leakage rate but less than the rate of the first check. The unit is rejected, otherwise the uncondensed gas fill is valved to a mass spectrometer for a final leakage test. This leak detection system is applicable to the sealed enclosure and not to an open container device.

Finally, in U.S. Pat. No. 3,027,753 issued Apr. 3, 1962, to A. J. Harder, Jr., there is disclosed a leak detection device for detecting minute leaks in enclosed, sealed units. Specifically, the device detects leaks of any magnitude in a thermal insulation unit in which a charge of gas is contained within a hermetically sealed, flexible envelope of gas-impervious material. Also, the apparatus sequentially tests flexible walled sealed units of divergent sizes without a change of the setup of the machine required. Further, the resilient walled testing chamber closely conforms to the shape of the flexible walled unit under test to reinforce the unit walls and closely conform to the outer contours of the object under test to support the object against rupture by internal pressures but allow for minute amounts of leakage gas to reach the leak-detection apparatus. The '753 patent is not applicable to open container devices subject to leak detection.

The recent prior art also includes the following process for testing drum wheels for structural integrity and leakage of the pneumatic medium. A pneumatic test is conducted by clamping the wheel under test between two platens along the axial centerline of the wheel. The two platens each have elastomeric engaging discs on opposite interior faces or engaging surfaces. A chamber is therefore defined within the wheel cavity and between the two opposing platens. A compressive force of approximately 2,000 pounds per square inch (psi) is applied to the opposing platens to create a seal. The chamber is then pressurized to 55 psi plus or minus five pounds, wherein the wheel is submerged in a water bath and visually inspected for bubbles. The presence of bubbles indicates the passage of air from the interior defined chamber to the outer exposed wheel surface. The recent prior art devices also include various means for rotating the wheel to facilitate the search for air bubbles.

Such arrangements suffer from a plurality of deficiencies in addition to those attendant the prior art references discussed hereinabove. It has been the practice that the pneumatic pressure is applied to the normally exposed or outer surface of the drum wheel and any escaping bubbles are detected on the edge surface of the wheel normally covered by a tire. It should be appreciated that in the procedure just described, the pressurized air is forced in a direction opposite to those forces present under normal operating conditions. Furthermore, these prior art testing procedures and devices require that the wheel be placed in a fluid medium to facilitate detection of air leakage. Finally, the test procedure requires a subjective analysis or inspection by a human observer to decipher whether a bubble is forming on the surface of the wheel being tested. The inspector must discern a bubble originating from air leakage from a bubble caused by immersing the wheel into the fluid medium, a subjective test at best.

Additionally, a machine for leak testing wheels in the automotive industry employs a hydraulic press. The press captures the wheel under test between a top and a bottom platen providing an inner chamber within the structure of the wheel. A housing is lowered over the wheel to form an outer chamber that encloses the wheel. A vacuum is drawn on the outer chamber and a test gas such as helium is introduced into the inner chamber. If a leakage exists in the structure of the wheel, the helium-air mixture will pass from the inner chamber to the vacuumized outer chamber. A helium monitoring device is present in the outer chamber which announces the presence of the test gas if a leak exists.

A major problem with this testing scheme is that under normal operating conditions the gaseous medium would pass from the tire cavity (outer chamber) through an existing leak in the wheel into the area described as the inner chamber during test conditions. This movement of the gaseous medium in reality is just opposite to the movement of the gas mixture in the described leak test. Where leakage holes of microscopic size are involved, it is important to test the structure of the wheel in a manner consistent with normal operating conditions of the wheel. Particles of aluminum or dust resident in the wheel structure are capable of blocking a leakage path measured in micro dimensions when the gaseous mixture is passed in one direction. However, when the gaseous mixture is passed in the opposite direction, the microscopic particles may be dislodged and the leakage path is exposed. Thus, a leakage test that applies the gaseous mixture in a direction opposite to the normal flow of air through the wheel if a leak occurred is not reliable in testing for leaks.

The foregoing problems continue to exist and, as such, a significant need exists for an improved apparatus and method for leakage detection in drum wheels or otherwise tubular open ended assemblies wherein the wheel can be quickly, reproducibly and reliably tested for structural integrity and leakage.

SUMMARY OF THE INVENTION

It is therefore an object of the present invention to provide an improved drum wheel leakage detection apparatus having superior accuracy relative to comparable leak detectors heretofore available.

It is a further object to provide an improved drum wheel leakage detection apparatus having a system of vacuum values which are automatically operated in a timed sequence upon sensing a plurality of vacuum levels.

It is a further object to provide an improved drum wheel leakage detection apparatus capable of reproducibly testing a series of multiple sized drum wheels.

It is another object to provide an improved drum wheel leakage detection apparatus capable of simulating the forces existing under normal operating conditions.

It is another object to provide an improved drum wheel leakage detection apparatus which automatically adjusts the volume of the annular second chamber.

It is another object to provide an improved drum wheel leakage detection apparatus which premeasures the volume of probe gas for each drum wheel tested.

It is another object to provide an improved drum wheel leakage detection apparatus which is quick and reliable and which avoids a test result dependent upon a subjective analysis.

Briefly, and in general terms, the present invention provides a new and improved leakage detector construction for drum wheels which substantially improves the reliability and accuracy of test results, and which significantly improves the efficiency of the test by introducing a system of vacuum valves which operate in a timed sequence automatically upon sensing vacuum levels. Moreover, the detector construction of the present invention is immediately reset after each test cycle, automatically adjusts the volume of an annular chamber and premeasures a volume of probe gas for each drum wheel tested, and is capable of simulating normal operating forces and reproducibly testing a series of multiple sized drum wheels.

In accordance with the present invention, a leakage detection apparatus and method therefore are provided for rapid, reliable and reproducible leakage testing of unmounted drum wheels for motor vehicles. Briefly, a preferred embodiment of the present invention includes a pair of opposing platens, the top platen extending from an air cylinder and being movable with respect to the fixed bottom platen. The pair of platens axially engage the wheel under atmospheric pressure and together with the wheel cavity defines an inner isolated first chamber. An enveloping cup-shaped housing is automatically movable via an air cylinder to surround the inner first chamber and together with the engaged drum wheel defines an annular second chamber surrounding the inner first chamber. The annular second chamber is separated by a common wall from the inner first chamber which is formed in part by the drum wheel being tested. Indeed, the positioning and cooperation of these parts enables the specific portions of the drum wheel susceptible to leakage to be tested.

A probe gas detector which is in selective gaseous communication with the inner first chamber, tests for the presence of the probe gas. Presence of the probe gas within the inner first chamber is indicative of a leakage path in the structural integrity of the drum wheel. A manifold interposed between the inner first chamber and a mass spectrometer assists in developing and preserving the high vacuum necessary to properly operate the mass spectrometer. A coordinated vacuum and electrical circuit is provided to automatically operate valves and perform mechanical operations in a sequentially timed manner to permit the successful testing of each drum wheel including the steps of storing, premeasuring, delivering, purging and evacuating the probe gas and cleansing the leakage detection apparatus thereof.

An advantage of the drum wheel leakage detection apparatus of the present invention is the superior accuracy relative to comparable leak detectors heretofore available.

Another advantage is that the drum wheel leakage detection apparatus has a system of vacuum valves which are automatically operated in a timed sequence upon sensing a plurality of vacuum levels.

A further advantage is that the drum wheel leakage detection apparatus is capable of reproducibly testing a series of multiple sized drum wheels.

A further advantage is that the drum wheel leakage detection apparatus is capable of simulating the forces existing under normal operating conditions.

A further advantage is that the drum wheel leakage detection apparatus automatically adjusts the volume of the annular second chamber.

A further advantage is that the drum wheel leakage detection apparatus premeasures the volume of probe gas for each drum wheel tested.

Still a further advantage is that the drum wheel leakage detection apparatus is quick and reliable and avoids a test result dependent upon a subjective analysis.

These and other features and advantages of the present invention will no doubt become obvious to those of ordinary skill in the art after having read the following more detailed description, when taken in conjunction with the accompanying drawings, which illustrate, by way of example, the features of the invention.

BRIEF DESCRIPTION OF THE DRAWINGS

FIG. 2 is a fragmented cross-sectional view of the leakage detection apparatus in the load position taken along the line 2—2 of FIG. 1;

FIG. 3 is a fragmented cross-sectional view of the leakage detection apparatus in the partially engaged position taken along the line 3—3 of FIG. 1;

FIG. 4 is a fragmented cross-sectional view of the leakage detection apparatus in the engaged position taken along line 4—4 of FIG. 1;

FIG. 5 is a cross-sectional view of the annular chamber of the leakage detection apparatus taken along the line 5—5 of FIG. 1;

FIG. 6 is a pressurized gas flow diagram of the leakage detection apparatus of FIG. 1; nd FIG. 7 is an electrical block diagram of the leakage detection apparatus of FIG. 1.

DETAILED DESCRIPTION OF THE PREFERRED EMBODIMENT

Figure 1:
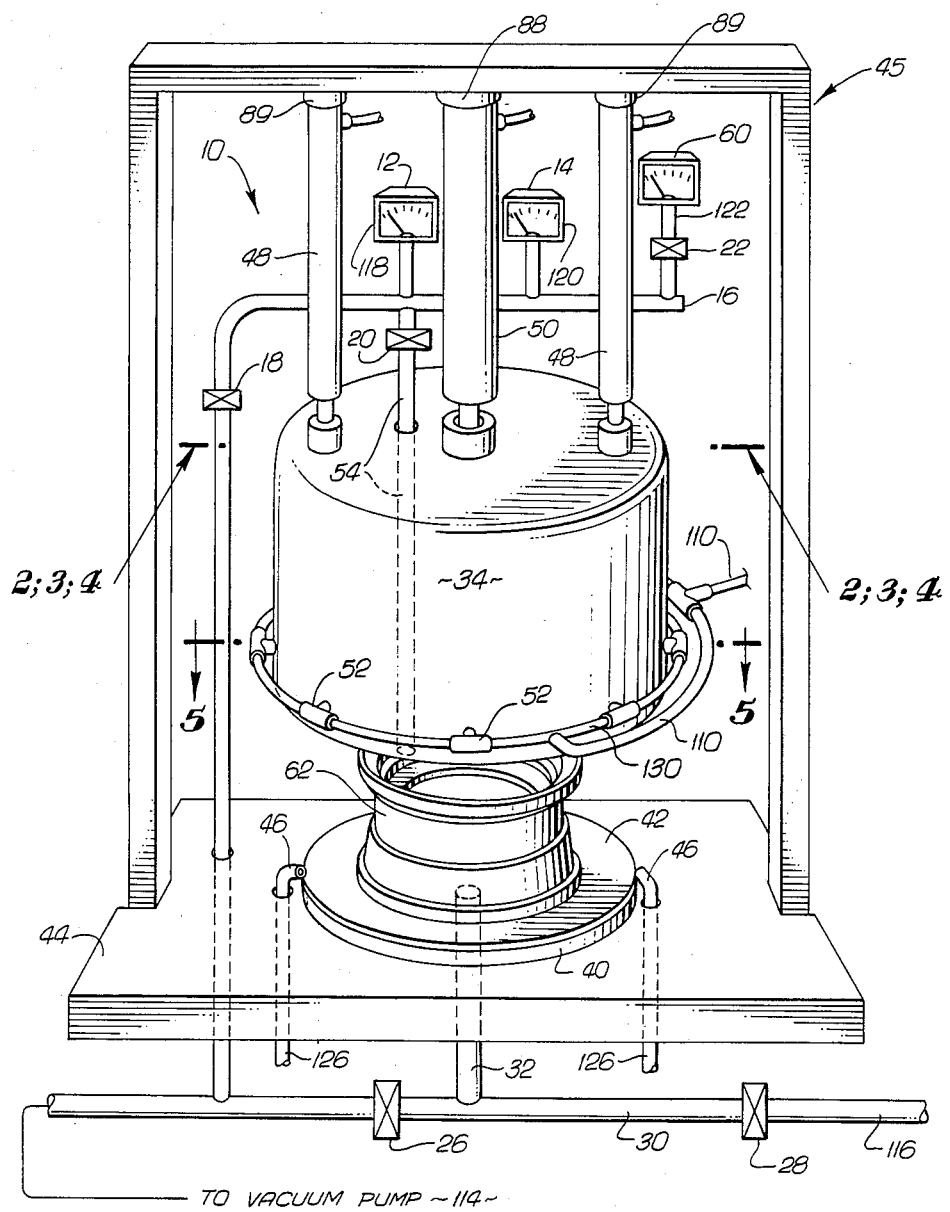
FIG. 1 is a perspective view of a leakage detection apparatus in accordance with the present invention.

As shown in the drawings for purposes of illustration, the invention is embodied in a leakage detection apparatus 10 of the type having an inner first chamber 80 formed within a drum wheel 62 and an annular chamber 84 formed about the drum wheel with the two chambers cooperating with a vacuum manifold 16 and a system of valves for testing the structural integrity of the drum wheel for leakage.

In accordance with the present invention, the vacuum manifold 16 and an electrical circuit 300 cooperate for improving the reliability and accuracy of the leakage test by introducing a system of vacuum valves which operate in a timed sequence upon sensing vacuum levels and also by significantly improving the efficiency of the test by performing a series of mechanical operations automatically controlled by as plurality of sensed vacuum levels ordered in the timed sequence. Further, the leakage detection apparatus 10 is immediately reset after each test cycle, automatically adjusts the volume of the annular chamber 84 and premeasures a volume of probe gas for each drum wheel 62 tested, and is capable of simulating normal operating forces and reproducibly testing a series of multiple sized drum wheels.

The leakage detection apparatus 10 for drum wheels is illustrated in FIG. 1 and incorporates the present invention. The leakage detection apparatus includes a plurality of gauges including a vacuum "A" gauge 12, a vacuum "B" gauge 14, the vacuum manifold 16, and the plurality of vacuum valves. The valves include a top vacuum valve 18, a sample separating valve 20, a detection valve 22, a bottom vacuum (main) valve 26, a vacuum release valve 28, plus a main vacuum line 30, and a vacuum draw line 32.

The detection apparatus 10 further includes an outer chamber 34 having a top platen 36 with a top platen seal ring 38 (shown in FIG. 2) and a bottom (table) platen 40 also having a bottom dable) platen seal ring 42, a support platform 44, an upper support structure 45, a plurality of blower nozzles 46, a plurality of air cylinders 48 for raising the outer chamber 34, an air cylinder 50 for raising and lowering the top platen 36, a plurality of helium supply inlets 52 and a gas vacuum line 54. Employed in conjunction with the leakage detection apparatus 10 is a mass spectrometer 60 for testing air samples drawn from inside the drum wheel 62.

Referring now to FIGS. 2, 3 and 4, each illustrating a cross-sectional view of the detection apparatus 10, there is further included an outer chamber seal ring 70, an outer chamber volume reducing disc 72 and a plurality of mechanical fasteners 74. The invention is embodied in the leakage detection apparatus 10 which engages the unmounted drum wheel 62 dr tubular member) with the top platen 36 and the bottom platen 40 to form the hermetically sealed inner first chamber 80.

The top platen seal ring 38 and the bottom platen seal ring 42 axially engage a pair of drum wheel rim flanges 82 to form the inner first chamber 80. The outer chamber 34 vertically translates along the air cylinders 48 and the volume reducing disc 72 is lowered and raised by the air cylinder 50. At the appropriate time, the volume reducing disc 72 is lowered to a rest position on the top platen 36. The outer chamber 34 is then lowered until seated upon the bottom platen seal ring 42. Also, the outer chamber 34 envelopes the drum wheel 62 while the disc 72 reduces the volume of the outer chamber 34 for defining the annular helium chamber 84 (see FIG. 4) circumventing the wheel 62 and the defined inner chamber 80.

The annular helium chamber 84 is comprised of that volume bounded by the volume reducing disc 72, the bottom platen 40, the outer chamber 34 and that portion of the wheel 62 which lies between the top platen 36 and the bottom platen 40. The volume of space between the upper portion of the outer chamber 34 and the volume reducing disc 72 (when the outer chamber 34 is in the lower position) is dot included within the annular helium chamber 84.

In gaseous communication with the helium chamber 84 is the plurality of helium supply inlets 52 which deliver the probe gas to the helium chamber. The inner chamber 80 is under vacuum and a sample of the atmosphere within the wheel 62 is analyzed to ascertain if the probe gas has leaked from the helium chamber 84 to the inner chamber 80 through the structure of the wheel 62. In addition, the detection apparatus 10 includes structure which stores, premeasures, delivers, purges and evacuates the probe gas and further cleanses the top platen 36 of the probe gas via the plurality of blower nozzles 46.

In the following discussion, helium is employed as the probe gas because the mass spectrometer 60, which is the analyzing device, is sensitive to gas molecules. The probe gas selected to act as a mixture element must be capable of being ionized. Helium, although an inert gas, is capable of being ionized while other more active gases (oxygen, nitrogen, hydrogen, carbon, etc appear in the combined state naturally.

In the preferred embodiment, the support platform 44 acts as a table to support the bottom platen 40, the wheel 62 and the vacuum draw line 32 extending therefrom. The support platform 44 has additional vertical structure in the upper support structure 45 (shown in FIG. 1) which is employed to support the air cylinders 48, 50 used to guide the vertical movement of the outer chamber 34, the volume reducing disc 72 and the top platen 36. However, it should be appreciated that the invention is not to be limited by the type of support platform 44 or support structure 45 that is employed. It is only significant that the support platform 44 and the support structure 45 maintain a sufficient spaced relationship to enable the leakage detection apparatus 10 to operate therebetween.

The air cylinder 50 includes a shaft 86 which extends from the upper support structure 45 toward the support platform 44. The shaft 86 is slidably mounted to the support structure 45 by a pneumatic expansion means 88 (see FIG. 1) to permit selective vertical axial movement relative to support platform 44. The pneumatic expansion means 88 is a solenoid operated pneumatic jack in the preferred embodiment, but could be any conventional device such as an electric motor driven actuator. Mounted on the far end of shaft 86 opposite to pneumatic expansion means 88) is the top platen 36 which is in threaded engagement with the shaft 86. For purposes of illustration and not limitation, the top platen 36 may be a plate or a circular disc approximately two feet in diameter. In one embodiment, the top platen 36 may have an aperture not shown) formed therein to enable gaseous communication therethrough. The top platen 36 is controlled by the solenoid operated air cylinder 50 and acts to seal off the inside cavity of the drum wheel 62. The air cylinder 50 incorporates a standard four-way solenoid valve for inducing vertical travel in the top platen 36. The air cylinder 50 includes a single cylinder driver which is electrically operated and air driven.

Mounted atop the support platform 44 and positioned opposite and substantially parallel to the top platen 36 is the bottom platen 40. The seal rings 38 and 42 are mounted on opposite inwardly facing surfaces of the top and bottom platens 36 and 40. In the preferred embodiment, the seal rings 38, 42 include annular rings formed of an elastomeric material of sufficient diameter to interface with the wheel rim flanges 82. Preferably, the seal ring 38 is coaxially mounted on the top platen 36 by the plurality of mechanical fasteners 74.

In the preferred embodiment, the bottom platen seal ring 42 is not fastened to the bottom platen 40 with fasteners 74. However, mechanical fasteners could be employed in an alternative embodiment. It should be recognized that when the top platen 36 is moved by the shaft 86 into engagement with the wheel 62 mounted atop the bottom platen 40, the inner chamber 80 is created and defined by the platens 36, 40, the rim flanges 82 and the inside cavity of the wheel 62.

Also shown in FIGS. 2-4 is the outer chamber 34 which is substantially coaxial with the shaft 86. The outer chamber 34 is slidably mounted upon the pair of air cylinders 48 controlled from a pneumatic air jack means 89 for permitting vertical axial movement of the outer chamber 34 relative to the platens 36, 40 and the support platform 44. The outer chamber 34 includes a cup-shaped housing 90 having a cylindrical wall 92 forming an enclosed end 94. A substantially coaxial central aperture 96 formed in the enclosed end 94 of the cylindrical wall 92 enables the shaft 86 to pass through the housing 90. A pair of venting apertures 97 are provided in the enclosed end 94 which are always open to vent the housing 90 to the atmosphere and to provide passage for the gas vacuum line 54.

The pair of air cylinders 48 are mounted atop the cup-shaped housing 92 with each cylinder 48 having a first end mounted to the support structure 45 (see FIG. 1) and a second opposite end mounted to the enclosed end 94 of the housing 90. The air cylinders 48 are electrically actuated pneumatic devices which selectively move the housing 90 axially along the shaft 86 relative to the top platen 36 and the support platform 44 from an engaged position shown in FIG. 4 to a resting position shown in FIGS. 2 and 3. Downward motion of the housing 90 is assisted by the force of gravity. The cylindrical wall 92 extends downward from the periphery of and substantially perpendicular to the enclosed end 94 of housing 90. A plurality of gas inlet apertures 100 are formed in the cylindrical wall 92 to permit the helium supply inlets 52 to communicate with the annular helium chamber 84. The apertures 100 are preferably located toward the bottom portion of the cylindrical wall 92 in a symmetrical manner. One embodiment includes a group of eight apertures distributed circumferentially.

An annular flange 102 extends radially inward from the bottom edge of the cylindrical wall 92. The inwardly extending annular flange 102 defines a bottom aperture 104 forming an open end of the cup-shaped housing 90 for passing the wheel 62 and the top platen 36 into the interior of the housing 90. Mounted to the annular flange 102 and extending radially inward therefrom is the helium chamber seal ring 70 which extends inward to engage the top or bottom platens 36, 40 respectively for providing a seal.

Further, each of FIGS. 2-4 illustrate the volume reducing disc 72 which is coaxially and slidably mounted to enable vertical axial movement upon the shaft 86 relative to the cup-shaped housing 90 and the top platen 36. The disc 72 is disposed within the housing 90 and is sized to engage and rest atop the top surface of the annular flange 102 when the detection apparatus 10 is in the rest position. The location of the disc 72 reduces the amount of probe gas escaping through the bottom aperture 104 with the disc 72 sized to ride close to the inside surface of the cylindrical wall 92 reducing the volume of the annular helium chamber 84.

The detection apparatus 10 is designed to accommodate a range of wheel sizes. In order to obtain consistent test results, the fixed volume of probe gas injected into the annular helium chamber 84 must be in proportion to the volume about the test wheel 62. To satisfy these conditions, the volume of the helium and air mixture in the annular helium chamber 84 must be in proportion to the volume inside the inner chamber 80 within the wheel 62 for different sized wheels. The disc 72 serves to adjust the volume within the outer chamber 34 to accomplish this requirement in combination with premeasurement of the probe gas discussed hereinafter. The position of the outer chamber 34 and the disc 72 form the annular helium chamber 84 sized in proportion to the wheel 62 under test with the volume of the inner chamber 80 being controlled by the wheel cavity as shown in FIG. 4. The walls of the wheel 62 form a portion of the boundary between the inner chamber 80 and the annular helium chamber 84.

The detection apparatus 10 includes a gas supply means which provides the probe gas to the annular helium chamber 84. In general, the gas supply means is incorporated within a pressurized flow control system 200 (shown in FIG. 6). The flow control system 200 is in gaseous communication with the annular helium chamber 84 via a gas connection line 110 (see FIGS. 5 and 6). The flow control system 200 includes a gas source of compressed helium 202, a standard pressure regulator 204 and a flow control device 206, each in communication with the gas connection line 110. The compressed helium is inert and non-flammable and the gas connection line 110 communicates the helium to the plurality of helium supply inlets 52 substantially distributing the probe gas symmetrically to the annular helium chamber 84.

Disposed within the gas connection line 110 is a helium injector valve 112 located between the compressed helium source 202 and the helium supply inlets 52 connected to the circular gas supply loop 130. The helium injector valve 112 enables the selective communication of helium to the annular helium chamber 84. In the preferred embodiment, the helium injector valve 112 is operated by an electrically controlled solenoid (shown in FIG. 7).

The present invention also includes a vacuuming means for enabling the sampling of the atmosphere of the inner chamber 80 for the probe gas as shown in FIGS. 1-4. In gaseous communication with the inner chamber 80 is a vacuum pump 114 (shown by connection in FIGS. 1-4). Any readily available commercial vacuum pump providing a pressure of 10-1 torr or a pressure of 100 microns mercury is acceptable. While vacuum pumps providing a lower pressure as herein described can be utilized with a commensurate reduction in cycle time, a pressure of 10-1 torr or 100 microns mercury is sufficient to operate the present invention within the desired time constraints. The vacuum drag line 32 connects the vacuum pump 114 to the inner chamber 80 via the main vacuum line 30.

The bottom vacuum valve 26 is interposed between the inner chamber 80 and the vacuum pump 114 to allow for the selective application of vacuum to the inner chamber 80 and the main vacuum line 30. A vacuum filter (not shown) is interposed between the vacuum pump 114 and the bottom vacuum valve 26 to prevent the passage of oil fumes to the inner chamber 80. In the preferred embodiment, the bottom vacuum valve 26 is operated by an electric solenoid while a vacuum release line 116 connects the main vacuum line 30 to the atmosphere. The vacuum release valve 28 selectively seals off the vacuum release line 116 from the atmosphere. In the preferred embodiment, the vacuum release valve 28 is electrically operated.

As illustrated in FIGS. 1-4, the vacuum manifold 16 is also in gaseous communication with the vacuum pump 114 and the inner chamber 80 as well as the main vacuum line 30. The vacuum manifold 16 includes the vacuum pipes located within the boundary defined by the top vacuum valve 18, the detection valve 22, the sample separating valve 20 and the vacuum lines extending from gauges 12 and 14. In the preferred embodiment, the top vacuum valve 18 is connected between the vacuum manifold 16 and the main vacuum line 30 with the sample separating valve 20 connected in the gas vacuum line 54. The vacuum manifold 16 assists in developing and preserving the high vacuum necessary to properly operate the mass spectrometer 60.

The detection valve 22 is interposed between the mass spectrometer 60 and the sample separating valve 20 while the vacuum gauges 12 and 14 are mounted to the vacuum manifold 16 between the top vacuum valve 18 and the detection valve 22. Each vacuum gauge 12, 14, which may be any suitable commercially available instrument, includes a vacuum gauge switch 118 and 120 respectively of the type which energizes an electrical circuit when a set vacuum level is attained. A sample connection line 122 gaseously communicates the detection valve 22 to the mass spectrometer 60 which analyzes the sample of atmosphere from inside the inner chamber 80.

The mass spectrometer 60 is separated from the leakage detection apparatus 10 by the detection valve 22 and is energized during the entire cycle of the leakage detection apparatus 10. The mass spectrometer 60 receives the sample of atmosphere from the inner chamber 80 via the vacuum manifold 16 and the sample connection line 122. Normally, the connection line 122 is closed even when the mass spectrometer 60 is energized. A small suction pump (not shown) which is located inside the mass spectrometer 60 is always energized. If the detector valve 22 is closed, the mass spectrometer 60 does not receive samples of atmosphere from the manifold 16. When the detector valve 22 is opened, a small amount of air sample is vacuum drawn into the mass spectrometer 60. If the helium probe gas concentration is below a preset level, the small suction pump draws a sample that contains essentially no helium. If the probe gas concentration is above the preset level, the helium will be detected.

The mass spectrometer 60 comprises a detector switch 302 (shown in FIG. 7) which includes a pair of wire leads extending therefrom which are either open or closed. If the analyzer of the mass spectrometer 60 indicates insufficient helium concentration, the detector switch 302 remains open but operates to close if the helium concentration is above the preset level. The operated detector switch activates the electrical system (see FIG. 7) to indicate a leaking wheel. The detection valve 22 also selectively communicates the inner chamber 80 with the mass spectrometer 60.

While the operation of the various valves can be performed manually, the preferred embodiment illustrates the actuation of the recited solenoid operated valves and indicator lights as shown in FIG. 7. The solenoids are activated electrically and sequentially to operate the plurality of valves. As described hereinafter, the above-indicated circuitry provides a means to monitor the process by various indicators disclosed supra. It should be noted that the disclosed electrical circuit is but one of several circuit designs capable of performing the timed sequence of events.

The present invention also includes a gas purging means illustrated in FIGS. 1-4 to disburse residual probe gas. The purging means disburses residual probe gas remaining under the top platen 36 and adjacent the bottom platen 40 after the previously tested wheel 62 is removed from the detection apparatus 10. More specifically, in the preferred embodiment the pair of blower nozzles 46 are mounted adjacent the bottom platen 40 on the support platform 44. The blower nozzles 46 are directed upward relative to the support platform 44 to effect a swirling current by the communicated air. As will be discussed hereinafter, an air blower 124 (shown in FIG. 6) is in gaseous communication with the pair of blower nozzles 46 by an air blower connecting line 126 to provide a moving air mass or current. The money air mass sweeps away residual probe gas trapped within the inner chamber 80 to prevent erroneous analyzer results by the mass spectrometer 60. The air blower 124 is electrically activated and integrated into the electrical circuit as discussed in conjunction with FIG. 7.

In another form, a compressed air source is selectively connected to the pair of blower nozzles 46 while an electrically actuated solenoid is operated to open or close an interposed compressed air source valve (see FIG. 6). It should be noted that each pneumatically operated (air actuated) device including the plurality of air cylinders (pneumatic jacks) 48 and the pneumatic air jack means 89 (each for the outer chamber 34) and the air cylinder 50 including the pneumatic expansion means 88 (for the top platen 36) may be operated from a local low pressure air supply (shown in FIG. 6).

A cross-sectional view of the bottom of the annular helium chamber 84 is disclosed in FIG. 5 illustrating the gas connection line 110 intersecting the helium injector valve 112. The gas connection line 110 surrounds a portion of the housing 90 and terminates in a circular gas supply loop 130 with eight of the helium supply inlets 52 distributed equally about the circumference thereof. Each of the helium supply inlets 52 are T-type fittings that penetrate the cylindrical wall 92 of the cup-shaped housing 90.

Viewing the penetrations as they appear across the cross-section line in a direction towards the bottom platen 40, the first interfacing line is the annular flange 102 located at the base of the cylindrical wall 92. The next interface line is the terminal edge of the helium chamber seal ring 70 with the remainder of the annular helium chamber 84 being bounded by the side edge of the wheel rim flange 82 and the cross-section through the side of the drum wheel 62. The speckled marks located between the annular flange 102 and the side edge of the wheel rim flange 82 represent the helium probe gas. The view down through the wheel 62 discloses an opening 132 in the bottom platen 40 for routing the vacuum draw line 32 therethrough. If leakage of the probe gas occurs across the boundary layer of the side of the drum wheel 62, defects in the structural integrity of the wheel 62 are indicated. The vacuum pump 114 (indicated in FIGS. 1-4) draws a vacuum through the draw line 32 evacuating the inner chamber 80 of the ambient environment.

After the helium gas is injected into the annular helium chamber 84 through the eight helium supply inlets 52, the probe gas will drift in the sealed annular helium chamber 84 due to the injection velocity applied thereto. If the probe gas appears in the inner chamber 80, the existing environment in combination with the probe gas forms a mixture which is evacuated by the vacuum draw line 32 and dispatched to the mass spectrometer 60 for analysis via the main vacuum line 30 and the vacuum manifold 16. The operation of the vacuum valve system will be explained in conjunction with FIGS. 6 and 7.

The operation of the vacuum valve system is controlled by the electrical circuit 300 and is illustrated in FIG. 7. There are five vacuum valves that operate according to a timed sequence that will be disclosed. The bottom vacuum valve 26 is located in the main vacuum line 30 and serves to switch the main vacuum supply on and off while providing the vacuum required at the bottom of the detection apparatus 10 for evacuating the inner chamber 80. The top vacuum valve 18 is located in the vacuum manifold 16 and serves to control the vacuum supply in the vacuum manifold and also assists in drawing the helium probe gas from the helium supply inlets 52 into the annular chamber 84.

The vacuum release valve 28 is located in the main vacuum line 30 and the vacuum release line 116 and acts to release the vacuum from the inner chamber 80 when the test on the wheel 62 is complete. The sample separating valve 20 is located in the vacuum manifold 16 and serves to draw a fixed volume of the mixture of air and helium (or just air in the absence of a leak) from the inner chamber 80. The mixture sample is temporarily retained awaiting injection thereof into the mass spectrometer 60. Finally, the detection valve 22 located at the entrance of the mass spectrometer 60 in the sample connection line receives the mixture sample from the sample separating valve 20 and delivers the sample to the mass spectrometer 60 in a timed sequence.

The pressurized flow control system 200 which illustrates those components necessary to initiate the delivery of the probe gas to the annular helium chamber 84 and then to deliver low pressure air for purging residual probe gas is shown in FIG. 6. Those components further include a helium measure valve 208, a measuring cylinder valve 210, a measuring cylinder 212, the helium injector valve 112, an outer chamber cleaner valve 214, a top platen solenoid valve 216, an outer chamber solenoid valve 218, the air blower laten cleaner) valve 124, the air blower connecting lines 126, the blower nozzles 46, the gas connection line 110, the circular gas supply loop 130, and the plurality of helium supply inlets 52.

Additionally, there is illustrated in FIG. 6 the valve pilots for the detection valve 22, the sample separating valve 20, the top vacuum valve 18, the bottom vacuum valve 26 and the vacuum release valve 28. Finally, a low pressure air source 220 is illustrated and further includes an air hand valve 222 and an air cleaning, lubricating and regulating device 224. The low pressure air source 220 is in series with an air line 226.

One of the many unique features of the instant invention is the premeasurement of the correct volume of probe gas to be employed for any particular wheel under test. The premeasurement means is incorporated into the pressurized flow control system 200 and specifically includes the helium measure valve 208, the measuring cylinder valve 210, the measuring cylinder 212 and the helium injector valve 112. Once the premeasurement and injection of the helium probe gas is complete, the purging of residual probe gas is accomplished by employing the outer chamber cleaner valve 214 and the air blower valve 124 in combination with the air line 226.

During the initial vacuuming stage, the vacuum switch 118 of the vacuum A gauge 12 closes as the vacuum level increases. Under these conditions, the helium measure valve 208 opens while the helium injector valve 112 closes. The measuring cylinder 212 includes a piston which is pneumatically operated and spring returned. The piston travels within the measuring cylinder 212 to create a chamber therein. When the measuring cylinder valve 210 is open, pressurized air from the low pressure air source 220 is free to travel through the air line 226 and the measuring cylinder valve 210. The low pressure air passing through the measuring cylinder valve 210 enters the bottom of the measuring cylinder 212 forcing the piston to the top of the travel of the chamber therein. When the measuring cylinder valve 210 is closed, the piston is spring returned to the bottom of the measuring cylinder 212.

During the premeasurement stage, the measuring cylinder valve 210 is closed and the helium measure valve 208 is open permitting helium from the gas source 202 to pass through the helium measure valve 208 and accumulate within the measuring cylinder 212. The size of the wheel 62 under test influences the length of time necessary to draw the initial vacuum in the system. Once the initial operating vacuum has been reached the vacuum "B" switch 120 well close which will cause the electrical operators in the vacuum valves to position themselves for delivering the helium probe gas to the annular helium chamber 84. However, until vacuum B switch operates, the helium measure valve 208 remains open permitting the probe gas to accumulate within the measuring cylinder 212. Therefore, the volume of probe gas that accumulates within the measuring cylinder 212 is directly proportional to the time required to draw the necessary vacuum and thus proportional to the volume of the inner chamber 80 of the wheel 62 under test.

When the vacuum "B" switch 120 closes, the helium measure valve 208 closes and the helium injector valve 112 opens. At this point, the measuring cylinder valve 210 is opened permitting low pressure air from the air line 226 to pass through the measuring cylinder valve 210 into the measuring cylinder 212. The low pressure air forces the piston in the measuring cylinder 212 to the top of the chamber. The helium probe gas is then directed out of the measuring cylinder and through the opened helium injector valve 112. The probe gas passes through the gas connection line 110 and into the circular gas supply loop 130. The gas then passes through the plurality of helium supply inlets 52 which feed the probe gas to the annular helium chamber 84.

After the helium probe gas is forced out of the measuring cylinder 212, the measuring cylinder valve 210 closes preventing the air from the air line 226 from passing into the cylinder 212 and allowing the spring of the cylinder 212 to return the piston to its normal position. Thus, the volume of the helium probe gas is measured by the time the helium probe gas flows during the premeasuring stage. This time interval determines how much helium probe gas is required to be stored in the chamber of the measuring cylinder 212.

At the end of a testing cycle, the helium injector valve 112 closes and the outer chamber cleaner valve 214 opens providing a pathway for the low pressure air of the air line 226 to the gas connection line 110. The low pressure air passes through the gas connection line 110 and the gas supply loop 130 forcing the evacuation of residual probe gas. The low pressure air also passes through the inlets 52 and into the annular helium chamber 84 to clean and purge the system of the helium probe gas for the next cycle. The venting apertures 97 located in the enclosed end 94 permit the purged helium probe gas to be vented out of the top of the housing 90.

During the period in which the outer chamber cleaner valve 214 is open permitting the purging of the annular helium chamber 84, the air blower valve 124 is activated. Low pressure air is then free to pass through the air blower connecting lines 126 and the blower nozzles 46 to clean the area around the bottom platen 40. Thus, the same fluid piping system is used during the purging stage to pass unmeasured purging air in the range of 90 to 100 psi for cleansing the system as is used during the premeasurement stage to measure and deliver the probe gas to the annular chamber 84.

The top platen solenoid valve 216, the outer chamber solenoid valve 218, and the valve pilots in the five vacuum operating valves (18, 20, 22, 26, 28), each include a standard four-way solenoid valve. Each of the valves include a valve sphere (not shown) which, in essence, passes the effect of the vacuum when the sphere is in a first position and blocks the effect of the vacuum when the sphere is in a second position. The valve sphere is pneumatically operated by an air cylinder. The air cylinder, however, is electrically operated to either pass or block the pneumatic force that operates a shaft for positioning the valve sphere.

In the operation of the detection apparatus 10, when the reset position is assumed, the outer chamber 34 is returned to the rest position. In the rest position, the top platen 36 and the associated seal ring 38 are spaced apart from the bottom platen 40 and the associated seal ring 42. The spacing is of a sufficient distance so that the top platen 36 is above the wheel rim flange 82. This position permits the removal of the previously tested wheel 62 and the replacement therebetween with of the next wheel to be tested. The volume reducing disc 72 is resting on the top surface of the annular flange 102. The position of those components prevents the escape of residual probe gas from the bottom of the outer chamber 34 and further prevents the contamination of the inner chamber 80 prior to the initiation of the vacuuming and testing of the next wheel. The venting apertures 97 in the enclosed end 94 of the cup-shaped housing 90 remain open for the evacuation of the probe gas.

At this point, the vacuum should be released by opening the vacuum release valve 28 and the flow of the probe gas should be halted by the closure of the helium injector valve 112. The next wheel 62 to be tested is coaxially positioned atop the bottom platen seal ring 42 which will engage the bottom wheel rim flange 82. All the vacuum valves are closed in the reset position between the test of each wheel 62 and then operated in sequence as explained hereinafter.

The electrical circuit 300 includes the solenoids and actuators for the top vacuum valve 18, the bottom vacuum valve 26, the vacuum release valve 28, the open sample separating valve 20 and the detection valve 22. Also included are the solenoids and actuators for the helium measure valve 208, the helium injector valve 112, the measuring cylinder valve 210, the air blower valve 124, the outer chamber solenoid valve 218, the outer chamber cleaner valve 214 and the top platen solenoid valve 216. Additionally, the detector switch 302 located in the mass spectrometer 60 is schematically illustrated in FIG. 7. Further, a bottom vacuum indicating lamp 304, a detection indicating lamp 306, a top vacuum indicating lamp 308, a sample separating indicating lamp 310, a helium injector indicating lamp 312, a vacuum release indicating lamp 314, an air blower indicating lamp 316, an outer chamber cleaner indicating lamp 318, a power-on switch 320, a power available indicating lamp 322, a reset switch 324 and a start switch 326 are each illustrated in FIG. 7.

Additional indicating devices include a white lamp 328 which signifies a wheel which has passed the leakage test, a red lamp 330 which signifies a wheel that has not passed the leakage test, and a buzzer 332 which indicates a tested wheel having excessive leakage. The remaining components on the electrical diagram 300 of FIG. 7 include a relay 336, a relay 338, a relay 340, a relay 342, a relay 344, a relay 346, a relay 348, a relay 350, a relay 352, a relay 354, a timer 356, a timer 358, a timer 360, a timer 362, a timer 364, a timer 366, a timer 368, a switch 370, a switch 372, a switch 374, and a switch 376.

When the leakage detection apparatus 10 is initially energized or after the completion of a previous leakage detection test, the top platen 36 and the outer chamber 34 are each in the raised (rest) position. Also, each of the vacuum operating valves are closed, and the air blower valve 124 is closed. The testing procedure for the next wheel 62 is initiated by closing the power-on switch 320 which connects the power input terminals 400, 401, to the electrical circuit and illuminates the power available lamp 322. The start switch 326 is a two-pole spring loaded normally open push button switch which connects the energized lead 401 from the power-on switch to switches 374, 376. The switches 374, 376 are activated by electrical impulse from the start switch 326.

A first impulse on lead 403 will cause one of the switches to pulse on, while the second of the two switches will pulse off through the leads 403 and 422. A second operation of the start switch 326 will provide a pulse which reverses the leads 403 and 422 causing the Operation of the switches 374 and 376 to reverse. Thus, by activating the start switch 326, the electric switches 374, 376 are reversed. This causes lead 407 on switch 374 to become energized and to subsequently cause the measuring cylinder 212 to reduce its volume to zero. The top platen 36 which is connected to lead 407 descends by gravity to form the inner chamber 80 in combination with wheel 62 and the bottom platen 40. Simultaneously the bottom vacuum valve 26, the top vacuum valve 18 and the sample separating valve 20 each open while the detection valve 22 and the vacuum release valve 28, the air blower valve 124 and the vacuum release valve 28 each remain closed.

The vacuum pump 114 begins to draw vacuum in the inner chamber 80 which increases over time and simultaneously, the timer 360 begins to count. The timer 360 is a 32 second timer which is employed for limiting the time permitted for the testing of any particular wheel. The cup-shaped housing 90 supports the volume reducing disc 72 which acts as a gravity bottom lid of the housing 90. The disc 72 remains several inches above the top platen 36 to isolate the inner chamber 80 from any helium contamination residue in the outer chamber 34 from the last test cycle. The disc 72 remains elevated and supported by the outer chamber 34 as long as the top platen 36 is not sealed to the inner chamber 80 by a sufficient amount of vacuum.

The vacuum "A" gauge 12 is adjusted to operate the vacuum switch 118 when the initial level of vacuum is reached in the manifold 16. Electrical lead 406 on vacuum "A" switch 12 becomes energized operating relays 342 and 344. Timer 366 energizes lead 410 which opens the helium measure valve 208 while lead 424 on relay 344 causes the measuring cylinder valve 210 to close which permits the spring to draw the piston down creating the chamber which becomes larger over time. Lead 438 on relay 342 is operated causing the corresponding lead on relay 352 to energize lead 420 which permits the cup-shaped housing 90 to descend around the inner chamber 80 until it rests upon the bottom platen 40. The volume reducing disc 72 of the housing 90 rests upon the top platen 36 and becomes the top lid of the annular helium chamber 84.

The inner chamber 80 is vacuum sealed before the outer chamber 34 is lowered into position onto the bottom platen 40. However the top and bottom platen seals 38, 42 leak and if the outer chamber 34 was lowered prematurely, residue probe gas would leak into the inner chamber 80 causing contamination. Therefore, an acceptable level of vacuum must be reached in the "A" gauge 12 prior to the lowering of the outer chamber 34. When the vacuum in the manifold 16 is sufficiently high to cause contact of the vacuum switch 118, then lead 420 becomes energized permitting the outer chamber 34 to gravity fall. Normally, the outer chamber solenoid 218 is energized by lead 420 which causes the air cylinders 48 to maintain the outer chamber 34 in an elevated position. However, when lead 420 is energized, the outer housing 34 is permitted to gently gravity fall onto the bottom platen 40. At this point, the helium probe gas is premeasured as it enters the measuring cylinder 212.

Upon the vacuum reaching a preset level in the manifold 16, the vacuum "B" switch 14 operates closing vacuum switch 120. The bottom vacuum valve 26 then closes by operation of lead 411 from relay 350. The volume of the helium probe gas in the chamber of the measuring cylinder 212 is proportional to the volume of the inner chamber 80 of the wheel 62 being tested. Upon the operation of the vacuum "B" switch 14, lead 408 energizes the corresponding lead in switch 372 which operates lead 416 in relay 346. Relay 346 energizes lead 448 which energizes the corresponding lead in timer 366. Lead 410 of timer 366 is operated in order to close the helium measure valve 208. The measuring cylinder 212 increased its volume against the spring pressure while the helium measure valve 208 was open. The helium probe gas was admitted slowly into the measuring cylinder 212 in preparation of transmission to the annular helium chamber 84 through the helium injection valve 112.

After a delay of from one-to-five seconds, the relay 346 also energizes lead 435 which energizes the corresponding lead in relay 344. Lead 424 of relay 344 in turn energizes the helium injector valve coil 112 for providing a passageway for the probe gas from the measuring cylinder 212 to the gas connection line 110. Lead 424 of relay 344 also energizes the measuring cylinder valve 210 which enables the low pressure air from air line 226 to force the plunger of measuring cylinder 212 upward against spring pressure. The action forces the helium probe gas through the helium injector valve 112 and onward towards the circular gas supply loop 130 through the gas connection line 110. Once the measuring cylinder valve 210 is closed, the piston of the measuring cylinder 212 is withdrawn by spring action.

After vacuum "B" switch 120 has operated, the vacuum continues slowly to increase with a sample of the air mixture from the inner chamber 80 circulating slowly through the open sample separating valve 20, the manifold 16 and the top vacuum valve 18 towards the vacuum pump 114. The distribution of the air sample from the inner chamber 80 continues for a few seconds regulated by the three second timer 362 causing the gaseous content of the manifold 16 to be the same as the gaseous content of the air mixture within the inner chamber 80. After three seconds, the timer 362 energizes lead 417 to close the top vacuum valve 18 while lead 447 of timer 362 energizes relay 350 causing lead 419 to close the sample separating valve 20. Simultaneously, lead 415 of timer 358 energizes the corresponding lead to open the detection valve 22 which is regulated by the three second timer 358.

There are three situations which may occur during the test of the drum wheel 62. The first situation is that the drum wheel 62 does not include penetrating holes and thus does not pass the probe gas. In this situation the drum wheel 62 is labeled a "good wheel". If the drum wheel 62 includes small penetrating holes, the probe gas will pass through the wheel 62 and thus the wheel is labeled a "bad wheel". In the worse case, large penetrating holes exist which permit an excessive volume of the probe gas to pass through the drum wheel 62. In this case, the drum wheel 62 is labeled a "very bad wheel" and the testing procedure is interrupted and terminated.

For each one of the three above-recited situations, the leak detection apparatus 10 selects a different cycle based upon the supervision and reaction of the combination of the vacuum switch 118, the vacuum switch 120, and the 32 second limiting timer 360. The foregoing discussion of the pressurized flow control system 200 and the electrical diagram 300 is identical for all three situations until the detection valve 22 opens and passes a sample of the atmosphere from the inner chamber 80 to the mass spectrometer 60. The result of the analysis of the gas sample by the mass spectrometer 60 determines if the detector switch 302 within the mass spectrometer 60 will close energizing lead 413. The remainder of the discussion of the test procedure concerns the operation of the leak detection apparatus 10 resulting from the analysis of the gas sample.

If the helium concentration in the probe gas sample is very low, the helium concentration will not be detected by the mass spectrometer 60 and the timer 358 will count to the end of its three second cycle. The white lamp 328 which indicates a "good wheel" will be illuminated and the timer 360 will cease counting. Since the very low helium concentration is not detected by the analyzer in the mass spectrometer 60, the detector switch 302 is not activate and line 413 circuited therefrom is not energized.

The operation of the electrical circuit 300 is as follows. At the end of the three second cycle of timer 358, line 433 energizes the corresponding line in relay 342 which in turn activates lines 407 and 450 of relay 342. Line 450 in relay 342 activates the corresponding line in timer 360 which energizes line "W" prior to the thirty-two second time limit counted out by timer 360. Line "W" of timer 360 energizes the white lamp 328 indicating that the wheel 62 under test did not leak the probe gas. Concurrently, line 438 of relay 342 is deactivated which simultaneously deactivates line 438 of relay 352 resulting in the deactivation of line 420 from relay 352 to the coil of the outer chamber solenoid valve 218. This action results in activating the air cylinders 48 for driving the cup-shaped housing 90 upward to the rest position.

Within three to ten seconds after the cup-shaped housing 90 is driven to the rest position, the detection valve 22 is closed by the deactivation of line 415 after timer 358 completes its three second cycle. Each of the remaining vacuum operating valves are now in the closed position including the helium injector valve 112 which was closed after the delivery of the helium probe gas to the outer helium chamber 84 and before the outer chamber 34 was lifted to the rest position. Relay 336 stops counting and resets the basic thirty-two second cycle timer 360. Line "W" is also connected from timer 360 to relay 336 which deenergizes line 451 in relay 336 since line "W" and relay 336 return to the common line 400. This results in line 451 on relay 336 to change to the open position from the contact position. Note that line 451 is also connected to timer 356 and to timer 360 so that when line 451 on timer 356 is deenergized, line 444 on timer 356 also deenergizes the corresponding line to timer 360 which ends the cycle.

Next, the purging cycle is initiated by lines 439 and 440 on the three second timer 368. Line 422 on timer 368 energizes the corresponding line on switch 376 which supplies power to line 425 on switch 376 and energizes the corresponding line on relay 352. At this point, the cup-shaped housing 90 has reached the rest position and lead 425 has energized lead 434 on relay 352. Likewise, lead 434 on timer 364 is energized for seven seconds. Also, lead 434 on relay 352 energizes lead 417 for opening the top vacuum valve 18 for the purging cycle. Lead 434 of relay 352 additionally activates the corresponding lead on relay 348 which energizes the lead 419 for opening the sample separating valve 20. Line 426 on relay 348 is also energized for opening the vacuum release valve 28 to release the vacuum in the manifold 16, and for energizing the air blower valve 124 and the outer chamber cleaner valve 214. The operation of each of these valves by line 426 on relay 348 begins the purging cycle to clean the lower platen area 40, the annular helium chamber 84 and the manifold system 16.

The existing vacuum holds the wheel 62 clamped between the top platen 36 and the bottom platen 40 for receiving a stamped insignia indicating that the wheel does not leak or that it is a "good wheel". The stamping of the wheel may be done manually or by employing robotics.

After stamping the wheel, the reset switch 324 is activated either manually or by robotics for lifting the top platen 36 and purging the detection system 10. Reset switch 324 energizes lead 439 and 440 on timer 368 which in sequence reverses the order and closes each of the vacuum operating valves and the air blower valve 124, the outer chamber cleaner valve 214, the vacuum release valve 28, and deenergizes the top platen solenoid coil 216 through lead 407 for activating the air cylinder 50 for driving the top platen 36 upward. The leak detection apparatus 10 is now positioned for testing the next wheel.

The mass spectrometer 60 will detect the presence of helium in the manifold 16 by indication on a microvolt meter incorporated within the mass spectrometer. The indication or reading which will show the relative proportionality (in percent) of the helium in the gas sample distributed in the manifold 16. Additionally, the presence of helium in the gas sample analyzed by the mass spectrometer 60 will energize the detector switch 302 and provide power to line 413 as described hereinafter. The detector switch 302 is an adjustable device such that the activation point of the switch can be calibrated to make contact over a range of microvolt meter readings. Thus, the threshold point between a high helium concentration indicating a bad wheel and a low helium concentration indicating a good wheel may be adjusted to reflect the desired sensitivity.

The following description indicates the operation of the electrical circuit 300 after lead 413 in the detector switch 302 has been energized. It should be kept in mind, however, that lead 413 could be employed to activate robotic automated equipment to determine a leakage coefficient of each test wheel 62. After lead 413 is energized, the corresponding lead of switch 370 activates lead "R" to energize the red lamp 330 indicating that the wheel 62 has failed the leakage test. Additionally, line 413 of the mass spectrometer 60 also energizes the corresponding line in relay 354 energizing normally open leads 439 and 440. Leads 439 and 440 energize the corresponding leads in the three second timer 368 shorting the leads together causing timer 368 to activate which initiates the purging cycle and the resetting of the leakage detection apparatus 10.

Note that during the test procedure for a good wheel, the reset switch 324 must be activated either manually or automatically to contact leads 439 and 440 to operate the timer 368. However, in the second situation during the testing of a bad wheel, lead 413 of detector switch 302 short circuits the leads 439 and 440 in relay 354 to automatically activate the timer 368 to initiate the purging cycle.

Once the timer 368 has been activated, lead 422 is energized activating the corresponding lead in switch 372, switch 374 and switch 376. These three switches are reset returning the leakage detection apparatus 10 to the first step of the test procedure in the following manner. Switch 372 activates line 416 for assisting in the opening of the vacuum valves and activating the purging system. Switch 374 open circuits the line 407 which deenergizes the corresponding lead for relay 342. Lead 438 from relay 342 then energizes the corresponding lead in relay 352 which activates lead 420 causing the outer chamber solenoid 218 to be driven up by the air cylinders 48.

Simultaneously, the deenergizing of lead 407 deenergizes the top platen solenoid 216 which causes the air cylinder 50 to drive the top platen 36 upward to the rest position. The wheel 62 under test is no longer clamped between the top platen 36 and the bottom platen 40. Thus, any attempt to stamp the wheel that has failed the leakage test with the designation of "good wheel" would result in tipping the wheel. Switch 376 energizes lead 425 which activates the seven second timer 364 which regulates the amount of time for purging the detection apparatus 10 of the probe gas. Line 434 of timer 364 energizes the corresponding lead in relay 348. Lead 426 of relay 348 is energized activating the electrical coil in the vacuum release valve 28, the air blower valve 124 and the outer chamber cleaner valve 214 for the seven second purging cycle.

Switches 374 and 376 are identical, each having a common wire 400 connected to the chassis return. Also note that each of the switches have connected thereto leads 403 and 422. Note that these two leads are connected in reverse order in the switches 374 and 376. In switch 374, if the electrical energy is supplied to lead 422, line 407 is disconnected from the power lead 401. However, if the electrical energy is delivered to lead 403, switch 374 changes position and lead 407 becomes energized for restarting the test cycle. Since leads 403 and 422 are in reverse order on switch 376, if the electrical energy is supplied to lead 422 lead 425 is energized by way of the power lead 401. However, if the electrical energy is supplied to lead 403 then lead 425 becomes disconnected from the power lead 401.

Note that the detection apparatus 10 cycles through the complete procedure when a wheel has passed the leakage test and when a wheel has failed the leakage test. Thus, in the case of the testing of a good wheel and after the vacuum "B" switch 120 has activated, the timer 356 and the timer 360 cease counting which terminates the test cycle. In the situation involving the testing of a bad wheel and after the vacuum "B" switch 120 has activated, lead 439 and lead 440 of relay 354 are short circuited activating timer 368. In essence, this action by-passes the reset switch 324 which also terminates the cycle.

As will be discussed hereinafter, the mere activation of the vacuum "B" switch 120 indicates either that the wheel is good and does not leak, or that the wheel has a leak and has failed the leak detection test. If the vacuum level in the manifold 16 does not reach a sufficient level to activate the vacuum B switch 14, a very bad leak in the test wheel 62 is indicated. Under these conditions the remainder of the test cycle lasts for less than forty seconds.

When a test wheel 62 includes a large hole that will pass the probe gas through the structure of the wheel, the capacity of the vacuum pump 114 is limited. Under these conditions, the vacuum increases very slowly taking much longer than the thirty-two seconds allotted by the limit timer 360. If the necessary vacuum level to operate the mass spectrometer 60 is not reached, then the vacuum switch 120 does not close and the timer 360 reacts to stop development of the vacuum. The absolute maximum length of a cycle of the detection apparatus 10 is fifty-five seconds. Thus, if a wheel 62 includes a large hole which sufficiently impedes the development of the necessary vacuum within the prescribed time limit, the timer 356 and the timer 360 interrupt and terminate the existing test cycle so that the conveyor system that delivers and carries away the wheels does not stop.

The timer 356 and the timer 360 start counting at the initiation of each test cycle. Timer 360 is the basic thirty-two second limit timer which will reject the wheel if the test is not completed within the thirty-two seconds allotted. The timer 356 is a forty second limit timer that continues to count eight additional seconds beyond the timer 360 to provide the purging function of the detection apparatus 10.

If the vacuum switch 120 does not contact within the allotted thirty-two seconds of timer 360, line 445 is energized for the eight additional seconds required for timer 356 to complete its forty-second cycle. Line 445 from timer 360 energizes the buzzer 332 to provide an audible signal that the wheel being tested is rejected. During the eight seconds in which the line 445 is energized, the vacuum operating system is reset and the purging cycle is completed. After the timer 356 completes the forty-second cycle, line 445 of timer 360 is deenergized and the detection apparatus 10 is reset.

During the resetting of the detection apparatus 10, line 445 activates relay 350 energizing lead 447 which activates lead 419 closing the sample separating valve 20. Additionally, lead 411 of relay 350 activates and closes the bottom vacuum valve 26. Under the conditions in which the operating vacuum is reached closing vacuum switch 120, the detection apparatus 10 would complete the normal cycle within the allotted thirty-two seconds. Under these conditions, lead 408 on vacuum "B" switch 120 would energize the corresponding lead of switch 372. The detection apparatus 10 would continue the test cycle to determine if the wheel under test was acceptable or not. However, the bottom vacuum valve 26 and the sample separating valve 20 were closed prior to the termination of the fortieth count by timer 356 for the following reason.

The mass spectrometer 60 requires a high vacuum to properly operate and when the vacuum level is not achieved, the cycle is interrupted. To properly reset the detection apparatus 10 for the next test cycle, the vacuum in the manifold 16 must be released and the gas sample which includes a high concentration of helium must be purged. To properly purge the systems each of the vacuum operating valves must be cycled open to permit the low pressure air that is routed through the outer chamber cleaner valve 214 and the air blower valve 124 to cleanse the inside of the manifold 16. If the detection valve 22 is opened for the purpose of purging while the vacuum level in the manifold 16 is less than the normal operating level, the mass spectrometer 60 will be damaged.

In order to avoid damage to the mass spectrometer 60, the bottom vacuum valve 26 and the sample separating valve 20 were closed by the operation of relay 350 as previously described. This action in effect separates the wheel 62 from the process of vacuuming. Since the large hole in the wheel 62 passes the probe gas and impedes the development of the vacuum, isolation of the wheel from the manifold 16 is necessary to reset the apparatus 10.

The vacuum pump 114 continues to draw a vacuum in the manifold 16 through the top vacuum valve 18. The detection valve 22 remains closed until the vacuum in the manifold 16 reaches the operating level closing the vacuum switch 120. The three second timer 358 energizes lead 415 which opens the detection valve 22 to complete the analyzing and purging steps of the cycle. Since the necessary vacuum level has been achieved, the mass spectrometer 60 will not be damaged. A sample of the atmosphere from the inner chamber 80 passes the detection valve 22 and is admitted to the mass spectrometer 60 for analysis. Because of the large hole in the wheel being tested, the sample has a high percentage of helium concentration.

The detector switch 302 is normally open, but closes in response to the high concentration of helium in the gas sample energizing lead 413. The corresponding lead activates switch 370 which energizes lead "R" illuminating the red lamp 330 indicating that the wheel is rejected. At this point, the values of detection apparatus 10 are postured as if the wheel under test included only a minor leak, but was still rejected upon completion of the test cycle. Therefore, once lead 413 of the detector switch 302 has been energized, the electrical system 300 responds in the same manner to purge and reset itself as previously described for a rejected wheel with only a minor leak.

It is significant to note that the electrical diagram described in FIG. 7 is only one of several alternate electrical designs available to satisfy the test format of the vacuum operating system. Therefore the electrical diagram 300 described in FIG. 7 is offered only by way of example and is not intended to limit the invention described herein.

From the foregoing, it will be appreciated that the leakage detection apparatus of the present invention permits each drum wheel to be tested for air leakage in a rapid and efficient manner, that the test is reliable and is conducted by principles consistent with the normal operation of the wheel. Further, the detection apparatus is fully automated and is immediately reset after each test cycle providing stamped insignia to each "good wheel" for post-testing identification. The detection apparatus can be equipped with robotics which eliminated the need for the presence of a human operator.

It will be apparent from the foregoing that, while particular forms of the invention has been illustrated and described, various modifications can be made without departing from the spirit and scope of the invention. Accordingly, it is not intended that the invention be limited except as by the appended claims.

What is claimed is:

1. An apparatus for the detection of leakage in a drum wheel comprising, in combination:

sealing means for sealing a wheel cavity of said drum wheel for creating an inner chamber within said wheel cavity;

enveloping means having an open bottom for covering said drum wheel and for creating an annular chamber about said inner chamber;

evacuating means in communication with said inner chamber for creating a vacuum within said inner chamber, said evacuating means including a first vacuum switch activated by a first vacuum level within said inner chamber, said activated first vacuum switch for initiating the premeasurement of a probe gas in a flow controlling means;

supplying means penetrating said enveloping means for injecting said probe gas into aid annular chamber;

valving means disposed within said evacuating means for controlling said vacuum in said apparatus and for capturing a mixture a sample from said inner chamber; and detecting means in gaseous communication with said inner chamber for analyzing said mixture sample and for detecting the presence of said probe gas wherein presence of said probe gas in said mixture sample indicates leakage through said drum wheel.

2. The apparatus for the detection of leakage in the drum wheel of claim 1 wherein said sealing means comprises a fixed bottom platen and a vertically movable top platen.

3. The apparatus for the detection of leakage in the drum wheel of claim 2 wherein said fixed bottom platen and said vertically movable top platen each include a seal ring, each seal ring respectively mounted on an opposing face of said bottom and said top platens for respectively engaging a bottom and a top rim flange of said drum wheel.

4. The apparatus for the detection of leakage in the drum wheel of claim 2 wherein said enveloping means includes a cup-shaped housing having a central aperture located within an enclosed end and being movable in the vertical axial direction for raising above said drum wheel.

5. The apparatus for the detection of leakage in the drum wheel of claim 1 wherein said annular chamber is located between an inner side wall of a cup-shaped housing and a continuous exterior surface of said drum wheel.

6. The apparatus for the detection of leakage in the drum wheel of claim 4 further including a central air cylinder and a central shaft affixed to said central air cylinder, said shaft projecting through said central aperture of said cup-shaped housing and threadedly connected to said top platen for providing said vertical movement to said top platen.

7. An apparatus for the detection of leakage in a drum wheel comprising, in combination:

sealing means for sealing a wheel cavity of said drum wheel for creating an inner chamber within said wheel cavity;

enveloping means having an open bottom for covering said drum wheel and for creating an annular chamber about said inner chamber;

evacuating means in communication with said inner chamber for creating a vacuum within said inner chamber;

supplying means penetrating said enveloping means for injecting a probe gas into said annular chamber;

valving means disposed within said evacuating means for controlling said vacuum in said apparatus and for capturing a mixture sample from said inner chamber; and detecting means in gaseous communication with said inner chamber for analyzing said mixture sample and for detecting the presence of said probe gas wherein presence of said probe gas in said mixture sample indicates leakage through said drum wheel, and further including a volume reducing disc having a center penetration for receiving a central shaft affixed to a central air cylinder, said volume reducing disc being located intermediate a vertically movable top platen of the sealing means and san enclosed end of a vertically movable cup-shaped housing of the enveloping means with said volume reducing disc resetting upon and travelling axially with said top platen for adjusting the volume of said annular chamber in proportion to the volume of said drum wheel.

8. An apparatus for the detection of leakage in a drum wheel comprising, in combination:

sealing means for sealing a wheel cavity of said drum wheel for creating an inner chamber within said wheel cavity;

enveloping means having an open bottom for covering said drum wheel and for creating an annular chamber about said inner chamber;

evacuating means in communication with said inner chamber for creating a vacuum within said inner chamber;

supplying means penetrating said enveloping means for injecting a probe gas into said annular chamber;

valving means disposed within said evacuating means for controlling said vacuum in said apparatus and for capturing a mixture sample from said inner chamber; and detecting means in gaseous communication with said inner chamber for analyzing said mixture sample and for detecting the presence of said probe gas wherein presence of said probe gas in said mixture sample indicates leakage through said drum wheel, and including a volume reducing disc which receives a central shaft affixed to a central air cylinder, said volume reducing disc being located intermediate a vertically movable top platen of the sealing means and an enclosed end of a vertically movable cup-shaped housing of the enveloping means, with said volume reducing disc resting upon and travelling axially with said top platen for adjusting the volume of said annular chamber in proportion to the volume of said drum wheel, wherein a volume of said annular chamber is bounded by an inner side wall of said cup-shaped housing and a continuous exterior surface of said drum wheel and said volume reducing disc wherein said volume of said annular chamber is adjustable for maintaining a volume of said probe gas in proportion to a volume of said inner chamber.

9. The apparatus for the detection of leakage in the drum wheel of claim 1 wherein said evacuating means comprises a vacuum pumping means connected to a main vacuum line in mechanical communication with a vacuum manifold.

10. An apparatus for the detection of leakage in a drum wheel comprising, in combination:
   sealing means for sealing a wheel cavity of said drum wheel for creating an inner chamber within said wheel cavity;
   enveloping means having an open bottom for covering said drum wheel and for creating an annular chamber about said inner chamber;
   evacuating means in communication with said inner chamber for creating a vacuum within said inner chamber;
   supplying means penetrating said enveloping means for injecting a probe gas into said annular chamber;
   valving means disposed within said evacuating means for controlling said vacuum in said apparatus and for capturing a mixture sample from said inner chamber; and
   detecting means in gaseous communication with said inner chamber for analyzing said mixture sample and for detecting the presence of said probe gas wherein presence of said probe gas in said mixture sample indicates leakage through said drum wheel, wherein said supplying means comprises a gas connection line including a flow controlling means, said gas connection line in mechanical communication with a circular gas supply loop surrounding a cup-shaped housing of the enveloping means, said circular gas supply loop having a plurality of symmetrically spaced gas supply inlets penetrating said cup-shaped housing for supplying said probe gas to said annular chamber.

11. The apparatus for the detection of leakage in the drum wheel of claim 1 wherein said valving means comprises a bottom vacuum valve located in a main vacuum line, said bottom vacuum valve for controlling the vacuum supply within said inner chamber and for controlling the vacuum in a bottom portion of said evacuating means.

12. The apparatus for the detection of leakage in the drum wheel of claim 1 wherein said valving means comprises a top vacuum valve located in a vacuum manifold, said top vacuum valve for controlling the vacuum supply within said vacuum manifold.

13. The apparatus for the detection of leakage in the drum wheel of claim 1 wherein said valving means comprises a vacuum release valve located in a main vacuum line, said vacuum release valve for releasing in said inner chamber and in a vacuum manifold the atmospheric pressure when detection of leakage in the drum wheel is complete.

14. The apparatus for the detection of leakage in the drum wheel of claim 1 wherein said valving means comprises a sample separating valve located in a gas vacuum line, said sample separating valve for capturing a mixture sample of atmosphere from said inner chamber and storing said mixture sample for transmission to said detecting means.

15. The apparatus for the detection of leakage in the drum wheel of claim 1 wherein said valving means comprises a detection valve located in a sample connection line of a vacuum manifold, said detection valve for receiving said mixture sample from said inner chamber and for delivering said sample to said detecting means in a timed sequence.

16. The apparatus for the detection of leakage in the drum wheel of claim 1 wherein said detecting means comprises a mass spectrometer.

17. An apparatus for the detection of leakage in a drum wheel comprising, in combination:
   sealing means for sealing a wheel cavity of said drum wheel for creating an inner chamber within said wheel cavity;
   enveloping means having an open bottom for covering said drum wheel and for creating an annular chamber about said inner chamber;
   evacuating means in communication with said inner chamber for creating a vacuum within said inner chamber;
   supplying means penetrating said enveloping means for injecting a probe gas into said annular chamber;
   valving means disposed within said evacuating means for controlling said vacuum in said apparatus and for capturing a mixture a sample from said inner chamber; and
   detecting means in gaseous communication with said inner chamber for analyzing said mixture sample and for detecting the presence of said probe gas wherein presence of said probe gas in said mixture sample indicates leakage through said drum wheel, wherein said supplying means comprises a gas connection line including a flow controlling means, said gas connection line in mechanical communication with a circular gas supply loop surrounding a cup-shaped housing of the enveloping means, said circular gas supply loop having a plurality of symmetrically spaced gas supply inlets penetrating said cup-shaped housing for supplying said probe gas to said annular chamber and wherein said flow controlling means connected to said gas connection line comprises a helium injector valve.

18. The apparatus for the detection of leakage in the drum wheel of claim 4 further including a plurality of venting apertures located in said enclosed end of said cup-shaped housing for venting said probe gas.

19. The apparatus for the detection of leakage in the drum wheel of claim 1 wherein said activated first vacuum switch initiates a gravity controlled descent of said enveloping means.

20. The apparatus for the detection of leakage in the drum wheel of claim 1 wherein said evacuating means further includes a second vacuum switch activated by a second vacuum level within said inner chamber, said activated second vacuum switch initiating the flow of a premeasured level of said probe gas into said annular chamber.

21. An apparatus for the detection of leakage in a drum wheel comprising, in combination:
   sealing means for sealing a wheel cavity of said drum wheel for creating an inner chamber within said wheel cavity;
   enveloping means having an open bottom for covering said drum wheel and for creating an annular chamber about said inner chamber;
   evacuating means in communication with said inner chamber for creating a vacuum within said inner chamber;
   supplying means penetrating said enveloping means for injecting a probe gas into said annular chamber;

measuring means in gaseous communication with said supplying means for automatically premeasuring a volume of said probe gas delivered to said annular chamber, said premeasured volume of probe gas being determined by the volume of said inner chamber;

valving means disposed within said evacuating means for controlling said vacuum in said apparatus and for capturing a mixture sample from said inner chamber; and detecting means in gaseous communication with said inner chamber for analyzing said mixture sample and for detecting the presence of said probe gas wherein presence of said probe gas in said mixture sample indicates leakage through said drum wheel.

22. The apparatus for the detection of leakage in the drum wheel of claim 21 further including a helium measure valve in communication with said measuring means for admitting said probe gas to a measuring cylinder.

23. The apparatus for the detection of leakage in the drum wheel of claim 21 wherein said measuring means comprises a measuring cylinder for receiving said probe gas from a probe gas storing means and for holding said probe gas for delivery to said supplying means.

24. An apparatus for the detection of leakage in a drum wheel comprising, in combination:

sealing means for a sealing a wheel cavity of said drum wheel for creating an inner chamber within said wheel cavity;

enveloping means having an open bottom for covering said drum wheel and for creating an annual chamber about said inner chamber;

evacuating means in communication with said inner chamber for creating a vacuum within said inner chamber;

supplying means penetrating said enveloping means for injecting a probe gas into said annular chamber;

measuring means in gaseous communication with said supplying means for premeasuring a volume of said probe gas delivered to said annular chamber wherein said measuring means further includes a measuring cylinder valve for controlling the access of compressed air to a measuring cylinder, said compressed air for directing said probe gas to said supplying means;

valving means disposed within said evacuating means for controlling said vacuum in said apparatus and for capturing a mixture sample from said inner chamber; and detecting means in gaseous communication with said inner chamber for analyzing said mixture sample and for detecting the presence of said probe gas wherein presence of said probe gas in said mixture sample indicates leakage through said drum wheel.

25. The apparatus for the detection of leakage in the drum wheel of claim 23 wherein said measuring cylinder further includes a piston, said piston being pneumatically actuated for forcibly removing said probe gas from said measuring cylinder.

26. The apparatus for the detection of leakage in the drum wheel of claim 21 further including a helium injector valve for delivering said probe gas from said measuring means to said supplying means.

27. An apparatus for the detection of leakage in a drum wheel comprising, in combination:

sealing means for sealing a wheel cavity of said drum wheel for creating an inner chamber within said wheel cavity;

enveloping means having an open bottom for covering said drum wheel and for creating an annular chamber about said inner chamber;

evacuating means in communication with said inner chamber for creating a vacuum within said inner chamber, said evacuating means including a first vacuum switch activated by a first vacuum level within said inner chamber, said activated first vacuum switch for initiating the premeasurement of a probe gas in a flow controlling means;

supplying means penetrating said enveloping means for injecting said probe gas into said annular chamber;

valving means disposed within said evacuating means for controlling said vacuum in said apparatus and for capturing a mixture sample from said inner chamber;

detecting means in gaseous communication with said inner chamber for analyzing said mixture sample and for detecting the presence of said probe gas in said mixture sample; and purging means penetrating said enveloping means for injecting a quantity of air from a low pressure air source into said annular chamber for eliminating said probe gas and for cleansing said annular chamber upon the termination of a leakage detection test cycle.

28. The apparatus for the detection of leakage in the drum wheel of claim 27 wherein said purging means further includes an outer chamber cleaner valve for controlling the air flow from said low pressure air source to said annular chamber.

29. The apparatus for the detection of leakage in the drum wheel of claim 27 further including an air blower valve for controlling the air flow from said low pressure air source to as plurality of blower nozzles, said blower nozzles for providing a swirling air current about said sealing means.

30. An apparatus for the detection of leakage in a drum wheel comprising, in combination:

first sealing means for sealing a wheel cavity of said drum wheel for creating an inner chamber within said wheel cavity;

enveloping means having an open bell-shaped bottom for covering said drum wheel and for creating an annular chamber about said inner chamber;

evacuating means in communication with said inner chamber for creating a vacuum within said inner chamber, said evacuating means including a first vacuum switch activated by a first vacuum level within said inner chamber, said activated first vacuum switch for initiating the premeasurement of a probe gas in a flow controlling means;

second sealing means mounted to said enveloping means for providing a leak tight seal about said open bottom of said enveloping means;

supplying means penetrating said enveloping means for injecting said probe gas into said annular chamber;

valving means disposed within said evacuating means for controlling said vacuum in said apparatus and for capturing within said evacuating means a mixture sample from said inner chamber;

lifting means in mechanical communication with said enveloping means for providing vertical movement to said enveloping means during a leak detection procedure;

detecting means in gaseous communication with said inner chamber for analyzing said mixture sample and for detecting the presence of said probe gas wherein presence of said probe gas in said mixture sample indicates leakage through said drum wheel; and purging means mounted beneath said enveloping means for cleansing said apparatus of said probe gas after said enveloping means has bene vertically moved by said lifting means at a termination of said leak detection procedure.

31. The apparatus for the detection of leakage in the drum wheel of claim 30 wherein said second sealing means comprises a seal ring mounted to a bottom of an annular flange of a cup-shaped housing in said enveloping means.

32. The apparatus for the detection of leakage in the drum wheel of claim 30 wherein said lifting means comprises a plurality of air cylinders.

33. The apparatus for the detection of leakage in the drum wheel of claim 30 wherein said purging means comprises a plurality of blower nozzles directing a stream of compressed air supplied by an air source.

34. An apparatus for the detection of leakage in the drum wheel comprising, in combination:

a first platen including a first seal ring in mechanical communication with a first rim flange of said drum wheel;

a second platen having a second seal ring, said second platen being vertically movable in an axial direction providing mechanical contact between said second seal ring and a second rim flange of said drum wheel, said first and second seal rings being respectively mounted on opposing faces of said first platen and said second platen creating an inner chamber within a wheel cavity;

a cup-shaped housing having an open bottom for enveloping said drum wheel and for creating an annular chamber about said inner chamber, said housing being movable in a vertical axial direction by a plurality of air cylinders, and further including a central air cylinder and a central shaft affixed to said central air cylinder and threadedly connected to said second platen for providing said vertical movement in the axial direction;

a volume reducing disc having a center penetration surrounding said central shaft and being located above said second platen within said cup-shaped housing with said volume reducing disc resting upon and travelling axially with said second platen while said second platen is positioned within said cup-shaped housing for adjusting the volume of said annular chamber in proportion to the volume of said drum wheel;

pumping means connected to the inner chamber and a vacuum manifold for creating a vacuum and further including a first vacuum switch and a second vacuum switch, each located in said vacuum manifold;

a circular gas supply loop surrounding said cup-shaped housing, said supply loop including a plurality of symmetrically spaced gas supply inlets penetrating said cup-shaped housing for supplying a probe gas to said annular chamber;

a detection analyzer in gaseous communication with said inner chamber for analyzing a mixture sample from said inner chamber and for detecting the presence of said probe gas;

a plurality of blower nozzles mounted beneath said cup-shaped housing for directing a stream of compressed air for cleansing said apparatus of said probe gas; and a system of vacuum valves disposed in said pumping means for controlling the vacuum in said inner chamber and within said vacuum manifold.

35. The apparatus for the detection of leakage in the drum wheel of claim 34 wherein said second seal ring is mounted to said second platen by a plurality of mechanical fasteners.

36. The apparatus for the detection of leakage in the drum wheel of claim 34 wherein said cup-shaped housing comprises a cylindrical wall and an enclosed end.

37. The apparatus for the detection of leakage in the drum wheel of claim 36 wherein said enclosed end of said cup-shaped housing a central aperture.

38. The apparatus for the detection of leakage in the drum wheel of claim 37 wherein said central shaft affixed to said central air cylinder passes through said central aperture of said cup-shaped housing for vertically moving said second platen.

39. The apparatus for the detection of leakage in the drum wheel of claim 34 wherein said compressed air stream emitted by said blower nozzles is a swirling stream directed at said annular chamber when said cup-shaped housing is in a vertically lifted position.

40. The apparatus for the detection of leakage in the drum wheel of claim 34 wherein said system of vacuum valves comprises a bottom vacuum valve for controlling the vacuum in said inner chamber.

41. The apparatus for the detection of leakage in the drum wheel of claim 34 wherein said system of vacuum valves comprises a top vacuum valve for controlling the vacuum in said vacuum manifold.

42. The apparatus for the detection of leakage in the drum wheel of claim 34 wherein said system of vacuum valves comprises a vacuum release valve for releasing the atmospheric pressure into said inner chamber and into said vacuum manifold.

43. The apparatus for the detection of leakage in the drum wheel of claim 34 wherein said system of vacuum valves comprises a sample separating valve for capturing and storing said mixture sample.

44. The apparatus for the detection of leakage in the drum wheel of claim 34 wherein said system of vacuum valves comprises a detection valve for delivering said mixture sample to said detection analyzer in a timed sequence.

45. The apparatus for the detection of leakage in the drum wheel of claim 34 further including an outer chamber solenoid valve for controlling the vertical movement of said cup-shaped housing.

46. The apparatus for the detection of leakage in the drum wheel of claim 34 further including a second platen solenoid valve for controlling the vertical movement of said second platen.

47. The apparatus for the detection of leakage in the drum wheel of claim 34 wherein said first vacuum switch is activated by a first vacuum level within said inner chamber, said activated first vacuum switch for initiating the premeasurement of said probe gas in a flow control means.

48. The apparatus for the detection of leakage in the drum wheel of claim 47 wherein said activated first vacuum switch initiates a gravity controlled descent of said cup-shaped housing.

49. The apparatus for the detection of leakage in the drum wheel of claim 34 wherein said second vacuum switch is activated by a second vacuum level within said inner chamber, said activated second vacuum switch initiating the flow of a premeasured level of said probe gas into said annular chamber.

50. The apparatus for the detection of leakage in the drum wheel of claim 34 wherein a probe gas premeasurement time period is defined between the activation of said first vacuum switch and the non-simultaneous activation of said second vacuum switch, said activation of said first vacuum switch and said non-simultaneous activation of said second vacuum switch being dependent upon the volume of said inner chamber.

51. The apparatus for the detection of leakage in the drum wheel of claim 34, wherein the activation of said second vacuum switch positions a helium injector valve for supplying said probe gas to said annular chamber through said plurality of gas supply inlets.

52. The apparatus for the detection of leakage in the drum wheel of claim 34 further including a time measuring device for terminating a test cycle of said leakage detection apparatus when a second vacuum level for activating said second vacuum switch is not achieved within a preset time.

53. The apparatus for the detection of leakage in the drum wheel of claim 34 wherein said volume reducing disc further includes an off-center penetration for passing a gas vacuum line, said gas vacuum line extending through said second platen for collecting said mixture sample.

54. The apparatus for the detection of leakage in the drum wheel of claim 43 wherein said sample separating valve is located within gas vacuum line extending through said second platen for collecting said mixture sample.

55. A method for the detection of leakage in drum wheels, said method comprising the steps of: .
sealing a wheel cavity within said the drum wheel for creating an inner chamber within said wheel cavity;
evacuating said inner chamber for creating a vacuumized environment;
containing said sealed the drum wheel with a housing for forming an annular chamber surrounding said drum wheel;
premeasuring a portion of a probe gas proportional to a volume of said inner chamber;
supplying said premeasured portion of said probe gas to said annular chamber for detecting leaks of said probe gas to said vacuumized environment of said inner chamber;
operating a plurality of vacuum line valves for controlling said vacuumized environment;
sampling a portion of said vacuumized environment within said inner chamber for performing a chemical analysis;
analyzing said sampled portion of said vacuumized environment for detecting said probe gas; and
indicating the result of the analysis of said sampled portion wherein presence of said probe gas in said vacuumized environment indicates leakage in said drum wheel.

56. The method for the detection of leakage in drum wheels of claim 55, further including the step of raising said housing for exposing said drum wheel and for eliminating said annular chamber surrounding said drum wheel.

57. The for the detection of leakage in drum wheels of claim 55, further including the steps of removing said drum wheel and purging the environment beneath said housing with pressurized air for disbursing remnants of said probe gas.

58. A method for the detection of leakage in drum wheels, said method comprising the steps of:
inserting a drum wheel onto a support means;
sealing a cavity within said drum wheel for creating an inner chamber within said cavity;
evacuating said inner chamber for creating a vacuumized environment;
achieving a first vacuum level within said inner chamber for operating a first vacuum switch;
premeasuring a portion of a probe gas is proportional to the volume of said inner chamber;
storing said premeasured probe gas for delivery to said annular chamber;
achieving a second vacuum level within said inner chamber for operating a second vacuum switch and for terminating said premeasuring of said probe gas;
containing said sealed drum wheel for forming an annular chamber surrounding said the drum wheel;
injecting said premeasured portion of said probe gas into said annular chamber;
operating a plurality of vacuum line valves for controlling said vacuumized environment;
sampling a portion of said vacuumized environment within said inner chamber for performing an analysis;
analyzing said sampled portion of said vacuumized environment for detecting said probe gas; and
indicating the result of the analysis of said sampled portion wherein presence of said probe gas in said vacuumized environment indicates leakage in said drum wheel.

59. The method for the detection of leakage in drum wheels of claim 58 further including the step of lifting the container from around the sealed drum wheel for eliminating said annular chamber.

60. The method the detection of leakage in drum wheels of claim 58 including the step of cycling each of said plurality of vacuum line valves for releasing atmospheric pressure to said vacuumized environment.

61. The method the detection of leakage in drum wheels of claim 58 further including the step of removing the seal from said cavity of said drum wheel for eliminating said inner chamber.

62. The method for the detection of leakage in drum wheels of claim 58 further including the step of removing said drum wheel from said support means.

63. The method for the detection of leakage in drum wheels of claim 58 further including the step of purging the environment beneath said container with pressurized air for disbursing remnants of said probe.

64. A method for establishing a normal vacuum level during a leakage detection test of a severely leaking drum wheel, said method comprising the steps of:
inserting the drum wheel onto a support means;
sealing a cavity within said drum wheel for creating an inner chamber within said wheel cavity;
evacuating said inner chamber for achieving a first vacuum level and for operating a first vacuum switch;
premeasuring a portion of a probe gas proportional to the volume of said inner chamber;

isolating said drum wheel from said evacuation means;

evacuating a vacuum manifold isolated from said drum wheel for establishing a second vacuum level in said manifold;

operating a second vacuum switch after achieving said second vacuum level;

containing said sealed drum wheel for forming an annular chamber around said drum wheel;

supplying said premeasured portion of said probe gas to said annular chamber;

sampling a portion of the environment within said vacuum manifold for performing an analysis;

analyzing said sampled portion of said manifold environment for detecting said probe gas;

providing a visual signal for indicating that said drum wheel has failed said leakage detection test;

closing a detector switch in response to a high probe gas concentration;

operating a plurality of vacuum line valves for releasing atmospheric pressure to said vacuumized manifold;

purging the environment in said manifold with pressurized air for disbursing remnants of said probe gas; and resetting said plurality of vacuum line valves for the next leakage detection test.

* * * * *

UNITED STATES PATENT AND TRADEMARK OFFICE
CERTIFICATE OF CORRECTION

PATENT NO. : 4,813,268
DATED : March 21, 1989
INVENTOR(S) : Alex Helvey

It is certified that error appears in the above-identified patent and that said Letters Patent is hereby corrected as shown below:

Column 23, line 26, "aid" should be "said";

line 31, omit [a] before "sample";

Column 24, line 26, "san" should be "an";

Column 26, line 23, omit [a] before "sample";

Column 27, line 44, insert after "air" --for operating a piston located in said measuring cylinder--;

Column 29, line 9, "bene" should be "been";

Column 30, line 17, after "housing" insert --includes--;

Column 32, line 1, after "The" insert --method--; and

Signed and Sealed this

Thirty-first Day of July, 1990

Attest:

HARRY F. MANBECK, JR.

*Attesting Officer*      *Commissioner of Patents and Trademarks*